(12) United States Patent
Popovich et al.

(10) Patent No.: US 12,342,137 B2
(45) Date of Patent: Jun. 24, 2025

(54) SYSTEM AND METHOD UTILIZING DISCRETE MICROPHONES AND VIRTUAL MICROPHONES TO SIMULTANEOUSLY PROVIDE IN-ROOM AMPLIFICATION AND REMOTE COMMUNICATION DURING A COLLABORATION SESSION

(71) Applicant: NUREVA, INC., Calgary (CA)

(72) Inventors: David Gregory Popovich, Ottawa (CA); Mahdi Javer, Calgary (CA); David Gordon Johnson, Calgary (CA)

(73) Assignee: NUREVA INC., Calgary (CA)

( * ) Notice: Subject to any disclaimer, the term of this patent is extended or adjusted under 35 U.S.C. 154(b) by 157 days.

(21) Appl. No.: 17/739,926

(22) Filed: May 9, 2022

(65) Prior Publication Data

US 2022/0360895 A1   Nov. 10, 2022

Related U.S. Application Data

(60) Provisional application No. 63/186,450, filed on May 10, 2021.

(51) Int. Cl.
*H04R 3/00* (2006.01)
*G10K 11/178* (2006.01)
(Continued)

(52) U.S. Cl.
CPC ....... *H04R 3/005* (2013.01); *G10K 11/17823* (2018.01); *G10K 11/17873* (2018.01);
(Continued)

(58) Field of Classification Search
CPC .................................................... H04R 3/005
See application file for complete search history.

(56) References Cited

U.S. PATENT DOCUMENTS

| 4,499,578 A | 2/1985 | Marouf et al. |
| 4,536,887 A | 8/1985 | Kaneda et al. |

(Continued)

FOREIGN PATENT DOCUMENTS

| EP | 0903055 B1 | 10/2007 |
| EP | 2975609 A1 | 1/2016 |

(Continued)

OTHER PUBLICATIONS

Non-Final Office Action dated Oct. 11, 2023, from U.S. Appl. No. 17/516,480, 40 sheets.
(Continued)

*Primary Examiner* — Ping Lee
(74) *Attorney, Agent, or Firm* — KATTEN MUCHIN ROSENMAN LLP

(57) ABSTRACT

An integrated audio microphone system simultaneously provides in-room amplification and remote communication during a collaboration session with one or more local participants in a shared space and one or more remote participants. The integrated audio microphone system includes at least one microphone array and speaker system located in the shared space, at least one microphone system for amplification located in the shared space, an audio processor connected to the microphone system and the microphone array and speaker system, and a computer connected to the audio processor. The audio processor is configured to generate a plurality of virtual microphone bubbles and to amplify received audio signals from the microphone system for in-room audio amplification. The amplified audio signals are output to speakers of the microphone array and speaker system. Audio signals from the microphone system and the arrays of microphones are output to the computer to send the audio signals to one or more remote participants.

19 Claims, 17 Drawing Sheets

(51) Int. Cl.
  *H04R 1/02* (2006.01)
  *H04R 1/04* (2006.01)
  *H04R 1/40* (2006.01)
  *H04R 3/12* (2006.01)
  *H04R 27/00* (2006.01)

(52) U.S. Cl.
  CPC .............. *H04R 1/025* (2013.01); *H04R 1/04* (2013.01); *H04R 1/403* (2013.01); *H04R 1/406* (2013.01); *H04R 3/12* (2013.01); *G10K 2210/3027* (2013.01); *G10K 2210/505* (2013.01); *H04R 27/00* (2013.01); *H04R 2227/009* (2013.01); *H04R 2420/07* (2013.01); *H04R 2430/01* (2013.01)

(56) References Cited

U.S. PATENT DOCUMENTS

| | | | |
|---|---|---|---|
| 5,477,270 | A | 12/1995 | Park |
| 5,699,437 | A | 12/1997 | Finn |
| 6,469,732 | B1 | 10/2002 | Chang et al. |
| 6,593,956 | B1 | 7/2003 | Potts et al. |
| 6,912,178 | B2 | 6/2005 | Chu et al. |
| 6,912,718 | B1 | 6/2005 | Chang et al. |
| 7,130,705 | B2 | 10/2006 | Amir et al. |
| 7,254,241 | B2 | 8/2007 | Rui et al. |
| 7,489,788 | B2 | 2/2009 | Leung et al. |
| 7,720,232 | B2 | 5/2010 | Oxford et al. |
| 7,848,531 | B1 | 12/2010 | Vickers et al. |
| 7,995,768 | B2 | 8/2011 | Miki et al. |
| 8,185,387 | B1 | 5/2012 | Lachapelle |
| 8,861,537 | B1* | 10/2014 | Braithwaite ............ H04L 51/56 370/401 |
| 8,953,819 | B2 | 2/2015 | Ko et al. |
| 9,706,292 | B2 | 7/2017 | Duraiswami et al. |
| 9,800,964 | B2 | 10/2017 | McIntosh et al. |
| 10,003,900 | B2 | 6/2018 | Cartwright et al. |
| 10,042,038 | B1 | 8/2018 | Lord et al. |
| 10,063,987 | B2 | 8/2018 | McGibney |
| 10,229,697 | B2 | 3/2019 | Bastyr et al. |
| 10,237,639 | B2 | 3/2019 | McIntosh et al. |
| 10,387,108 | B2 | 8/2019 | McGibney |
| 10,397,726 | B2 | 8/2019 | McGibney |
| 10,848,896 | B2 | 11/2020 | McGibney |
| 10,972,835 | B2 | 4/2021 | Rollow, IV |
| 11,127,415 | B2 | 9/2021 | Magnusson et al. |
| 11,190,871 | B2 | 11/2021 | Yorga et al. |
| 2005/0280701 | A1 | 12/2005 | Wardell |
| 2006/0034469 | A1 | 2/2006 | Tamiya et al. |
| 2006/0165242 | A1 | 7/2006 | Miki et al. |
| 2008/0085014 | A1 | 4/2008 | Chen et al. |
| 2008/0107277 | A1 | 5/2008 | Somasundaram et al. |
| 2008/0285771 | A1 | 11/2008 | Tanaka et al. |
| 2009/0129609 | A1 | 5/2009 | Oh et al. |
| 2010/0034397 | A1 | 2/2010 | Nakadai et al. |
| 2010/0135118 | A1 | 6/2010 | Van Leest et al. |
| 2011/0135125 | A1 | 6/2011 | Zhan et al. |
| 2012/0093344 | A1 | 4/2012 | Sun et al. |
| 2012/0245933 | A1 | 9/2012 | Flaks et al. |
| 2013/0083934 | A1 | 4/2013 | Ahgren |
| 2013/0101134 | A1 | 4/2013 | Betts-Lacroix |
| 2013/0142342 | A1 | 6/2013 | Del Galdo et al. |
| 2013/0258813 | A1 | 10/2013 | Herre et al. |
| 2014/0050328 | A1 | 2/2014 | Fischer |
| 2014/0098964 | A1 | 4/2014 | Rosca et al. |
| 2014/0119552 | A1 | 5/2014 | Beaucoup |
| 2014/0133666 | A1 | 5/2014 | Tanaka et al. |
| 2014/0185824 | A1 | 7/2014 | Burnett |
| 2014/0314251 | A1 | 10/2014 | Rosca et al. |
| 2014/0348342 | A1 | 11/2014 | Laaksonen et al. |
| 2015/0185312 | A1 | 7/2015 | Gaubitch et al. |
| 2015/0222996 | A1 | 8/2015 | Chu et al. |
| 2015/0230026 | A1 | 8/2015 | Eichfeld et al. |
| 2016/0071526 | A1 | 3/2016 | Wingate et al. |
| 2016/0112469 | A1 | 4/2016 | Liu |
| 2016/0173976 | A1 | 6/2016 | Podhradsky |
| 2017/0178628 | A1* | 6/2017 | Macours ................. G10L 15/08 |
| 2017/0347217 | A1 | 11/2017 | Mcgibney |
| 2017/0366896 | A1 | 12/2017 | Adsumilli et al. |
| 2017/0374454 | A1 | 12/2017 | Bernardini et al. |
| 2018/0074782 | A1 | 3/2018 | McGibney |
| 2018/0098174 | A1 | 4/2018 | Goodwin et al. |
| 2018/0249267 | A1 | 8/2018 | Klingler et al. |
| 2019/0349471 | A1* | 11/2019 | Ferguson .............. H04M 3/568 |
| 2021/0035563 | A1 | 2/2021 | Cartwright et al. |
| 2022/0004355 | A1 | 1/2022 | McGibney |

FOREIGN PATENT DOCUMENTS

| | | |
|---|---|---|
| JP | 3154468 B2 | 4/2001 |
| JP | 2018026701 A | 2/2018 |
| WO | 03010995 A2 | 2/2003 |
| WO | 2022/118072 A1 | 6/2022 |

OTHER PUBLICATIONS

Notice of Allowance dated Feb. 7, 2024, from U.S. Appl. No. 17/516,480, 10 sheets.
Communication pursuant to Article 94(3) EPC dated Feb. 29, 2024, from European Patent Application No. 21204322.8, 9 sheets.
Communication pursuant to Article 94(3) EPC dated Mar. 12, 2024, from European Patent Application No. 19808293.5, 6 sheets.
Theodoropoulos D et al.: "A reconfigurable beamformer for audio applications", 7th Symposium on Application Specific Processors, 2009. SASP '09. IEEE,, Jul. 27, 2009, pp. 80-87, XP031522047, ISBN: 978-1-4244-4939-2.
International Search Report and Written Opinion mailed Sep. 15, 2017, from International Application No. PCT/CA2017/050642, 12 sheets.
Joseph Hector Dibiase, Thesis entitled, "A High-Accuracy, Low-Latency Technique for Talker Localization in Reverberant Environments Using Microphone Arrays", Brown University, May 2000.
Notice of Allowance dated Apr. 30, 2018, from U.S. Appl. No. 15/597,646, 18 sheets.
International Search Report and Written Opinion mailed Jun. 7, 2023, from International Application No. PCT/CA2023/50412, 11 sheets.
Extended European Search Report mailed May 7, 2019, from European Patent Application No. 17805437.5, 23 sheets.
Notice of Allowance dated May 24, 2019, from U.S. Appl. No. 16/110,393, 6 sheets.
Non-Final Rejection dated Sep. 17, 2018, from U.S. Appl. No. 16/110,393, 14 sheets.
International Search Report and Written Opinion mailed Oct. 12, 2017, from International Application No. PCT/CA2017/050676, 8 sheets.
Notice of Allowance dated Apr. 2, 2019, from U.S. Appl. No. 15/603,986, 42 sheets.
Final Rejection dated May 25, 2018, from U.S. Appl. No. 15/603,986, 13 sheets.
Non-Final Rejection dated Jan. 24, 2018, from U.S. Appl. No. 15/603,986, 26 sheets.
Communication pursuant to Article 94(3) EPC dated Feb. 17, 2020, from European Patent Application No. 17805437.5, 6 sheets.
Notice of Allowance dated Jul. 16, 2020, from U.S. Appl. No. 16/518,013, 19 sheets.
Non-Final Rejection dated Feb. 28, 2020, from U.S. Appl. No. 16/518,013, 21 sheets.
Notice of Allowance dated Apr. 11, 2019, from U.S. Appl. No. 16/110,393, 18 sheets.
Notice of Allowance dated Jan. 19, 2018, from U.S. Appl. No. 15/597,646, 22 sheets.
Notice of Allowance dated Aug. 16, 2021, from U.S. Appl. No. 17/097,560, 33 sheets.
Extended European search report from European Application No. 20194651.4 with a mailing date of Jan. 21, 2021, 11 sheets.
Extended European search report from European Application No. 17847841.8 with a mailing date of Jun. 28, 2019, 12 sheets.

(56) References Cited

OTHER PUBLICATIONS

Communication pursuant to Rules 70(2) and 70a(2) EPC from European Application No. 17847841.8 with a mailing date of Jul. 16, 2019, 1 sheet.
U.S. Appl. No. 62/343,512, filed May 31, 2016, 41 sheets.
U.S. Appl. No. 62/162,091, filed May 15, 2015, 52 sheets.
U.S. Appl. No. 62/345,208, filed Jun. 3, 2016, 44 sheets.
Non-Final Rejection dated Feb. 9, 2021, from U.S. Appl. No. 16/434,725, 72 sheets.
Notice of Allowance dated Jan. 25, 2023, from U.S. Appl. No. 17/374,585, 11 sheets.
Notice of Allowance dated Jan. 19, 2023, from U.S. Appl. No. 17/374,585, 41 sheets.
Non-Final Rejection dated Aug. 8, 2022, from U.S. Appl. No. 17/374,585, 57 sheets.
The extended European search report completed Feb. 2, 2022 (dated Feb. 10, 2022), from European Application No. 19808293.5, 8 sheets.
Emanuël A. P. Habets and Jacob Benesty, "A Two-Stage Beamforming Approach for Noise Reduction and Dereverberation", IEEE Transactions on Audio, Speeach, and Language Processing, vol. 21, No. 5, May 2013, pp. 945-958.
Gerhard Doblinger, "An Adaptive Microphone Array for Optimum Beamforming and Noise Reduction", 14th European Signal Processing Conference (EUSIPCO 2006), Florence, Italy, Sep. 4-8, 2006, 5 sheets.
Taylor B. Spalt, Christopher R. Fuller, Thomas F. Brooks, William M. Humphreys, Jr., "A Background Noise Reduction Technique using Adaptive Noise Cancellation for Microphone Arrays", p. 1-16, available at: https://ntrs.nasa.gov/search.jsp?R=20110012472 2018-05-16T17:29:07+00:00Z.
International Search Report and Written Opinion dated Oct. 3, 2019, from PCT/CA2019/050708, 9 sheets.
Notice of Allowance dated Feb. 10, 2023, from U.S. Appl. No. 16/421,908, 24 sheets.
Final Rejection dated Oct. 11, 2022, from U.S. Appl. No. 16/421,908, 26 sheets.
Non-Final Rejection dated Apr. 20, 2022, from U.S. Appl. No. 16/421,908, 38 sheets.
International Search Report and Written Opinion dated Jun. 15, 2023, from International Application No. PCT/CA2023/050371, 7 sheets.
International Search Report and Written Opinion dated May 30, 2023, from International Application No. PCT/CA2023/050277, 7 sheets.
The extended European search report dated Sep. 27, 2022, from European Patent Application No. 20749339.6, 15 sheets.
International Search Report and Written Opinion mailed May 22, 2020, from International Application No. PCT/CA2020/050100, 4+sheets. 10 pages.
Non-Final Rejection dated Dec. 10, 2020, from U.S. Appl. No. 16/774,258, 28 sheets.
Notice of Allowance dated Jul. 26, 2021, from U.S. Appl. No. 16/774,258, 21 sheets.
Lightspeed Technologies, "Audio Solutions for Classroom Reopening Challenges", Duplicom Presentation Systems, https://www.duplicom.com/products/lightspeed-audio-solutions/, Aug. 27, 2020, 7 sheets.
Luis Guerra, Troy Jensen, "How to Use the Shure MXA910 Ceiling Array Microphone for Voice Lift", Shure Incorporated, USA, Created Sep. 2016, upated Jul. 2018, Shure Incorporated, 11 sheets.
Alberta Infrastructure, "Sound-Field Systems Guide for Classrooms", published in May 2004, 19 sheets.
The extended European Search Report dated Feb. 11, 2022, from European Patent Application No. 21204322.8, 7 sheets.
International Search and Written Opinion dated Jul. 18, 2022, from PCT/CA2022/050731, 8 sheets.
Communication pursuant to Article 94(3) EPC dated Oct. 14, 2024, from European Patent Application No. 20749339.6-1207, 10 sheets.
International Search Report and Written Opinion mailed Aug. 9, 2024, for International Patent Application No. PCT/CA2024/050615, 9 sheets.
Office Action dated Feb. 7, 2025, from U.S. Appl. No. 18/126,739, 54 sheets.
The extended European search report dated Feb. 13, 2025, from European Patent Application No. 008516734, 11 sheets.
Unknown: "Microphone Array System System Integration Guide", Jan. 4, 2021 (Jan. 4, 2021), pp. 1-118, XP093246046, Retrieved from the Internet: URL:https://www.sony.com/electronics/support/res/manuals/5020/cdb05a7ca4b63cf5b65e48a717553195/50200951M.pdf, * pp. 6-19 *, * pp. 35, 36 *.
Slattery Mike: "Speech Reinforcement", Nov. 6, 2011 (Nov. 6, 2011), pp. 1-4, XP093246545, Retrieved from the Internet: URL:https://web.archive.org/web/20111106212236if_/http://rane.com/pdf/ranenotes/Introduction_to_Speech_Reinforcement_with_Conferencing.pdf, * pp. 1,2 *.

* cited by examiner

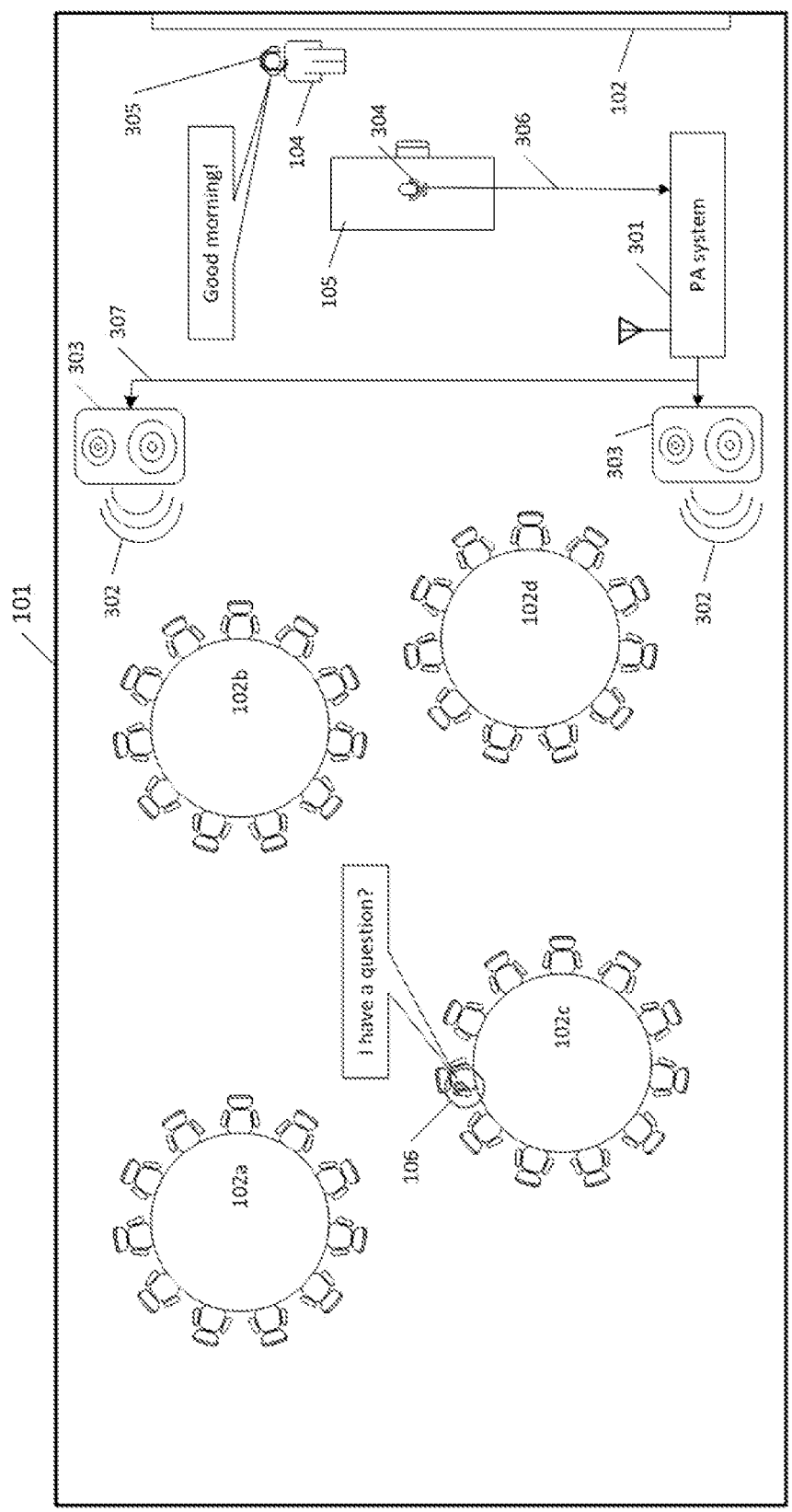
FIG. 3a - Prior art

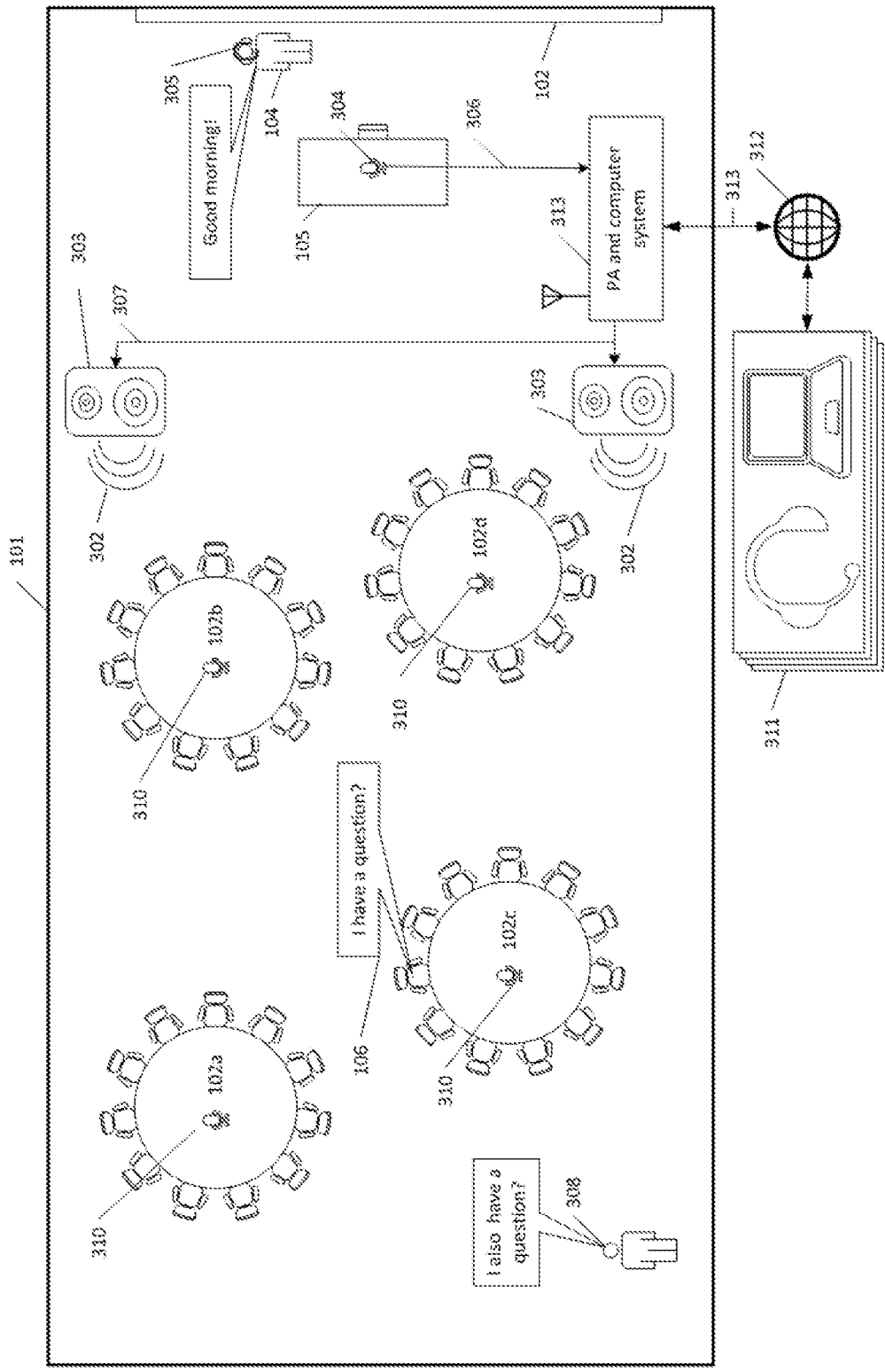
FIG. 3b - Prior art

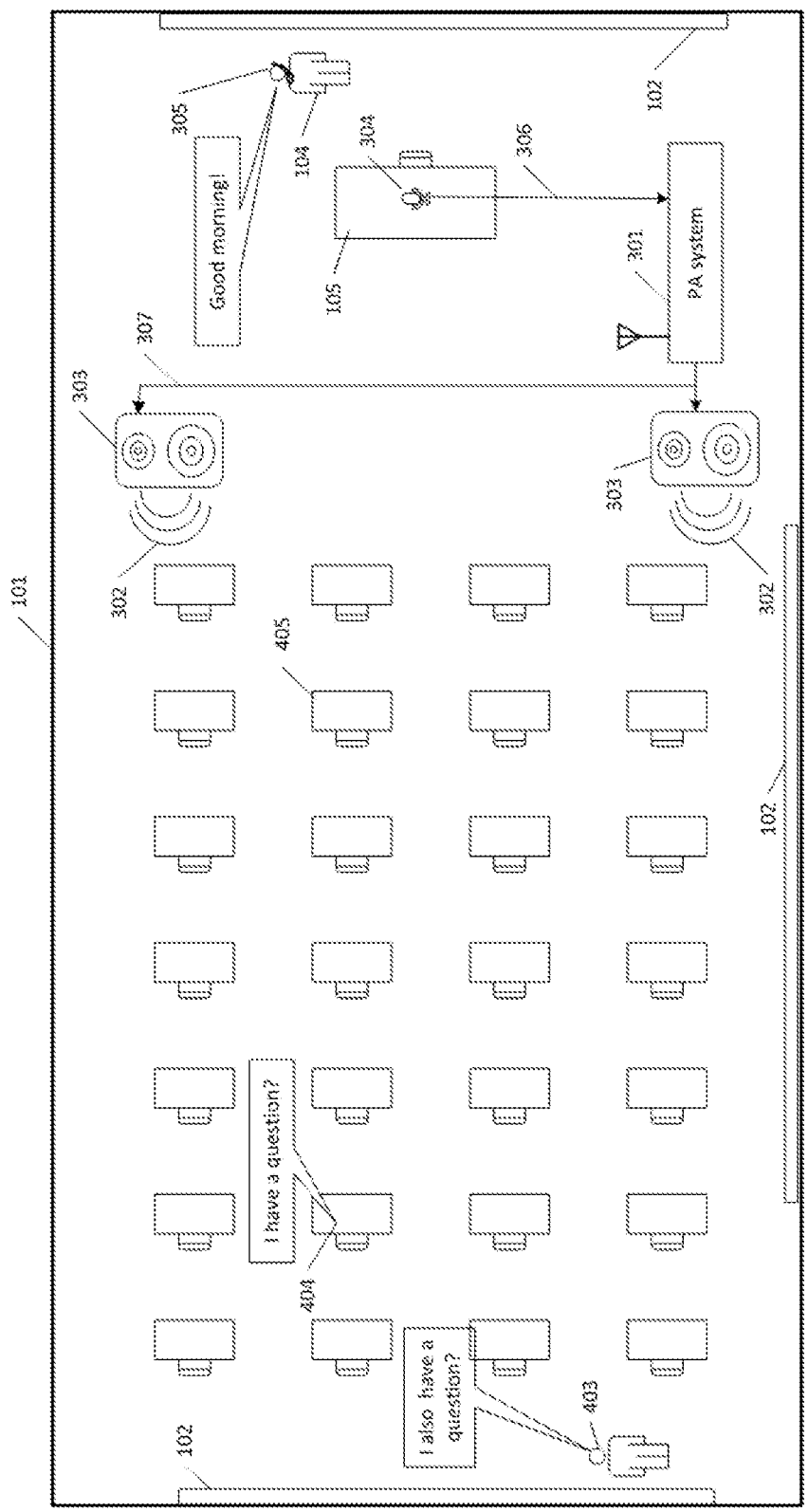
FIG. 4a - Prior art

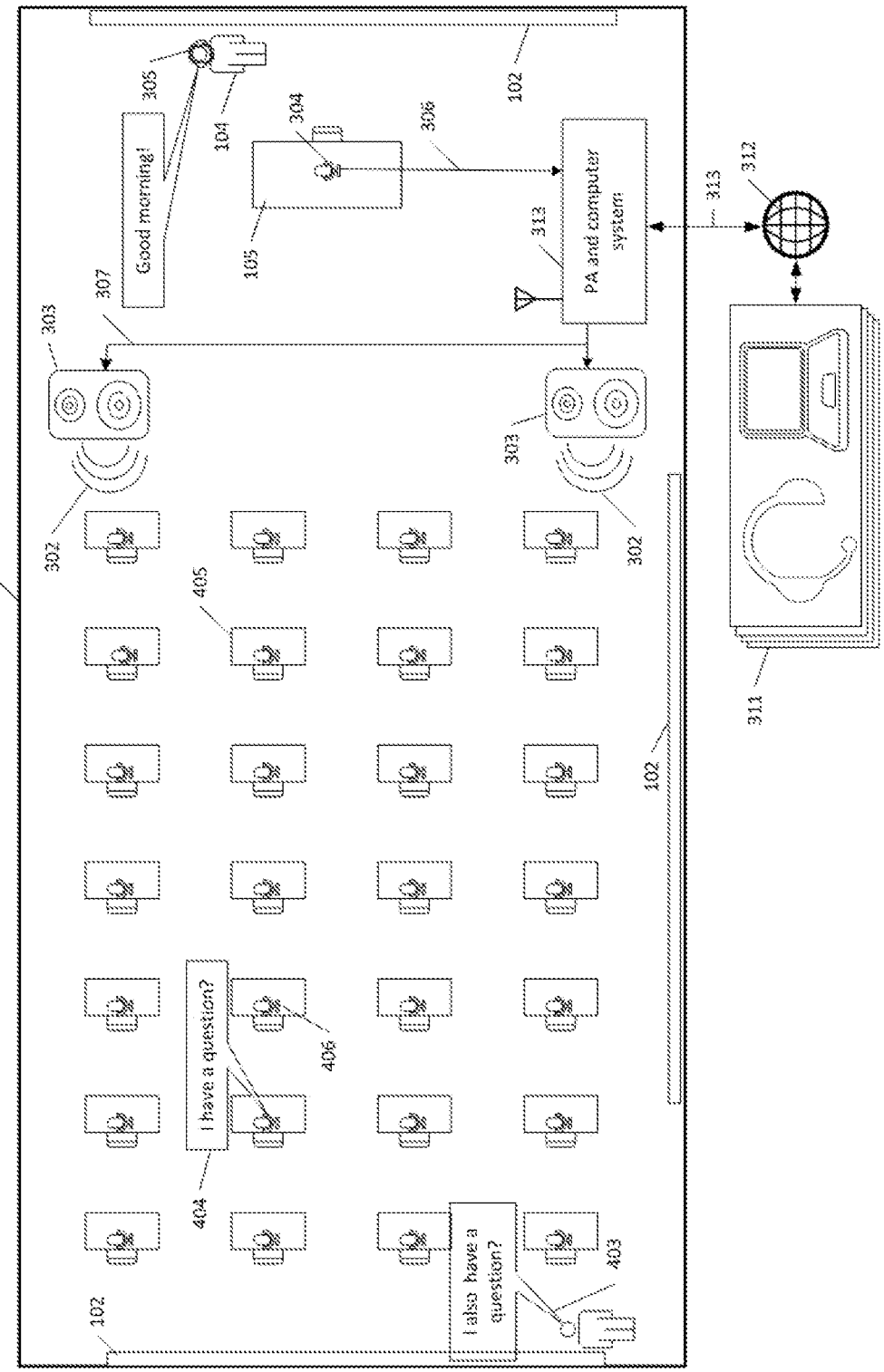
FIG. 4b – Prior art

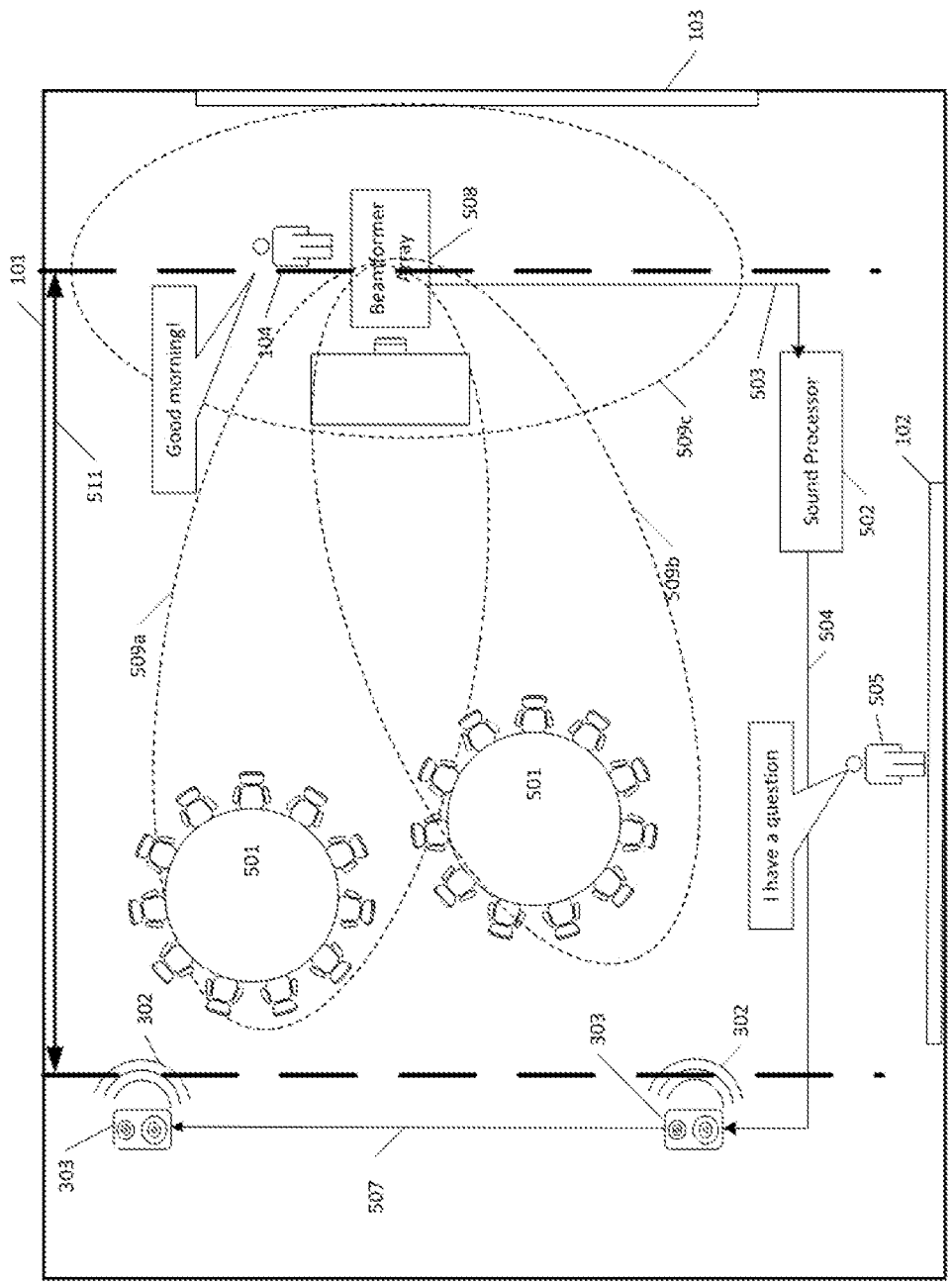
FIG. 5 — Prior art

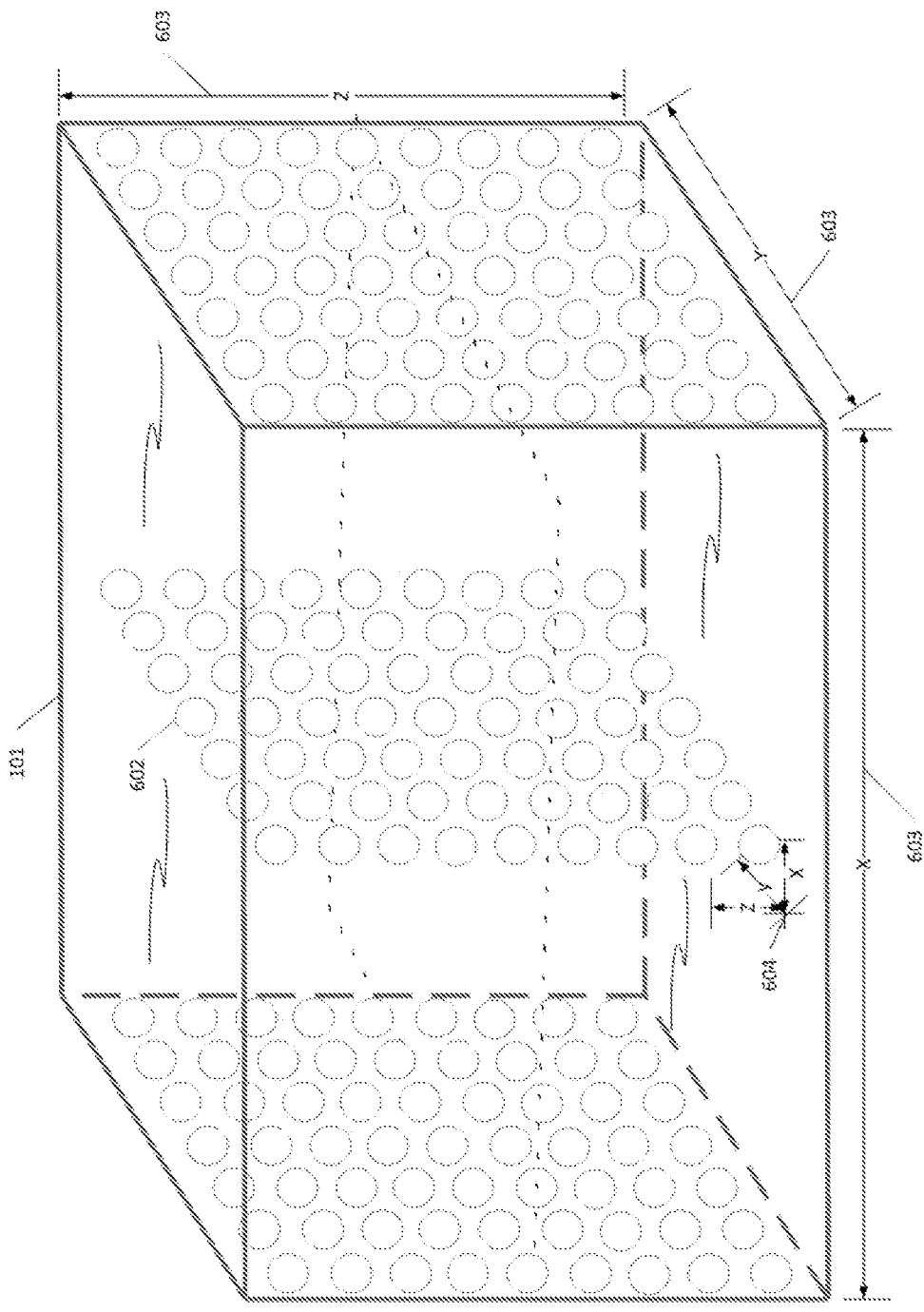
FIG. 6 (600)

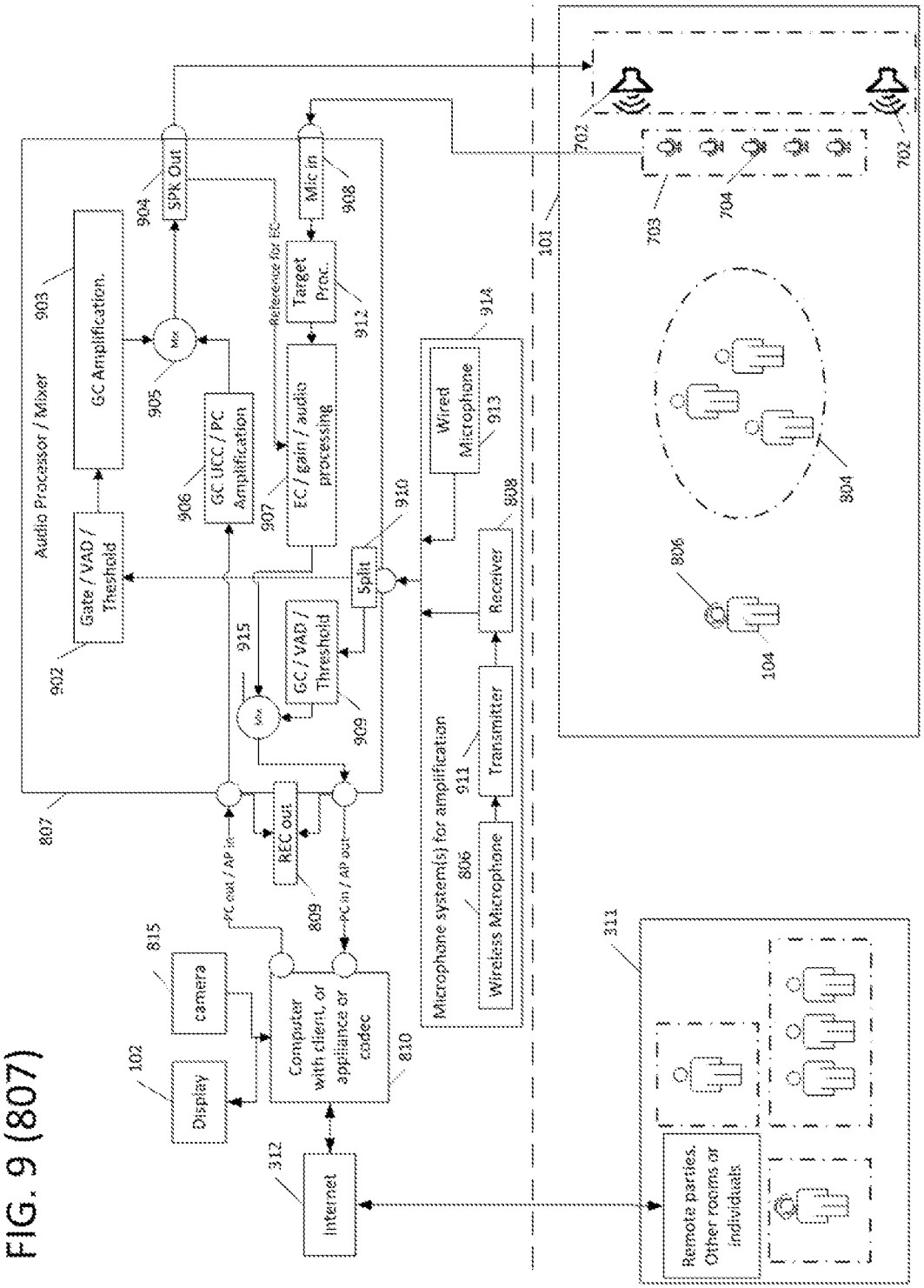
FIG. 9 (807)

SYSTEM AND METHOD UTILIZING DISCRETE MICROPHONES AND VIRTUAL MICROPHONES TO SIMULTANEOUSLY PROVIDE IN-ROOM AMPLIFICATION AND REMOTE COMMUNICATION DURING A COLLABORATION SESSION

CROSS REFERENCE TO RELATED APPLICATIONS

This application claims the priority of U.S. Provisional Application Ser. No. 63/186,450, filed on May 10, 2021, which is hereby incorporated herein by reference in its entirety.

BACKGROUND OF THE INVENTION

1. Field of the Invention

The present invention generally relates to audio conference and unified client collaboration sessions in spaces requiring a sound reinforcement system, and more particularly, to providing in-room sound reinforcement capability for select presenters while concurrently providing full room audio pickup for all participants including the presenters to support remote communication and collaboration with remote participants.

2. Description of Related Art

As collaboration, conference and teaching spaces become larger to meet the distance spacing requirements of the participants, the need for supporting fully active remote participants is also increasing as more participants require the option to attend events and classes remotely. As the spaces become larger to support distance separation between participants the room size or even just the spreading of the participants increases to a point that the facilitator (teacher) can no longer talk loud enough to be heard by all participants. The increased distance separation between participants puts increased demands on the in-room microphone pick up system to cover larger spaces. Larger spaces have typically required the installation of complex and costly microphone systems requiring setup, configuration and tuning. The combination of supporting full room microphone pick-up in conjunction with sound reinforcement of any number of presenters has been difficult to solve sufficiently in the currently known art to provide clear audio that is of high quality that is clear, clean, immersive creating an engaging session for all participants remote or those collocated in the room with the presenter.

Typically, in the currently known art, a standard public address system would be installed, and the facilitator (teacher) would need to use some sort of microphone attached to their body in some fashion to provide a source signal for the public address system (PA system) to use and send to the installed speakers placed around the room as needed. Such a simple system would not support full room pickup of the participants or the ability to support a unified communications session (UCC), such as for example Webex, Zoom, MS Teams etc. without a connection to a computer hosting the UCC client software. In the computer connected scenario remote participants would be able to hear the facilitator (teacher) but they would not be able to fully engage in or fully participate in the collaboration (classroom) environment or hear the other participants.

A further extension of the currently known art is to attempt to solve the full room pickup by placing discrete microphones throughout the room on desks and/or suspended from the ceiling in a grid pattern. This is a complex and costly method of providing full room acoustic pickup due to the hardware costs of deploying multiple discrete microphones and with a larger room more microphones are required which also increases the installation, wiring and configuration complexity of the system. In a one off installation this solution may be somewhat appropriate however in a medium to large scale deployment like dozens to hundreds to thousands of classrooms and conference rooms a discrete microphone centric full room audio pick-up solution becomes far too costly to deploy. It should be noted that to be heard by a discrete microphone the participant would be required to be closely positioned to the microphone location, hence the phrase pass the mic! It becomes clear that to provide a non-intrusive and full room acoustic pickup another solution is required.

In an attempt to work around the problems, certain systems attempt to use a microphone array utilizing beamformer technology. Although the use of a beamformer microphone array does not require the use of discrete microphone(s) for room zone coverage there are other considerations that can make this type of technology deployment problematic. Due to acoustic feedback issues that can be typical when a beamformer microphone array is used with a PA system there are design considerations on where the in-room PA speakers can be located in the room relative to the active beamforming array zone. If there is not enough separation between the speakers and the active beamformer zone, acoustic feedback may occur which can overload the audio system and present a howling through the speakers; if left unchecked, this feedback may result in damage to the speakers and other parts of the system. For systems that utilize a beamforming microphone array for full room audio pickup and for facilitator (teacher) pickup for the purpose of providing a source signal for an in-room active voice amplification system set of speakers, active beamformer zone separations need to be maintained. In conjunction with the physical constraints such system are typically used in a "Voice Lift" scenario which is the process of providing enough voice amplification to the facilitators (teachers) voice such that the participants can hear the facilitator (teacher) better without perceiving that their voice was amplified to the point of being localized to the PA system speakers. The reduced volume helps to prevent acoustic feedback into the beamforming microphone array. However, the setup and configuration of this type of system is a challenge for most medium to large scale deployments to get the speaker volume balance just right to perceive the facilitators (teachers) voice as only coming from the facilitator (teacher) and not the system speakers.

Therefore, the current art is not able to support a fully implemented UCC collaboration session with remote participants while providing sufficient in-room audio pickup coverage for all participants in the space regardless of their location in the room while concurrently providing an in-room amplification function for any number of presenters. Examples or descriptions of such current art include:

U.S. Pat. No. 7,995,768, entitled "Sound Reinforcement System" and issued Aug. 9, 2011;

U.S. Patent Application Publication No. 2008/0107277, entitled "Classroom Sound Amplification System" and published on May 8, 2008;

PCT Application PCT/IB02/02538 (published as WO 03/010995), entitled "Sound Reinforcement System Having a Multi Microphone Echo Suppressor as Post Processor" and published Feb. 6, 2003.

Lightspeed™ classroom audio solutions of Lightspeed Technologies.

"HOW TO USE THE SHURE MXA910 CEILING ARRAY MICROPHONE FOR VOICE LIFT," Luis Guerra, Troy Jensen, Shure Incorporated, USA. First published September 2016 and updated July 2018, describes the complexities of installing a voice lift system in an AV system using beam forming technology.

The guide, "SOUND-FIELD SYSTEMS GUIDE FOR CLASSROOMS," published in 2004 by Alberta Infrastructure. This guide was intended to be used to assist school administrators, parents and teachers in making an informed decision regarding the purchase of suitable sound-field systems. Information in this guide was based on feedback and informal classroom assessment received from teachers and students in the Edmonton region. The feedback formed part of a study on sound-field amplification systems conducted by Alberta Infrastructure in collaboration with educational audiologists from the Edmonton Public School Board, an independent technical consultant and electronics personnel from the Edmonton Catholic and Public School Boards.

SUMMARY OF THE INVENTION

Embodiments overcome the defects of the prior art to allow a provide in-room voice amplification for a facilitator as they freely move about a space (room), concurrently providing full room acoustic microphone pickup for all participants in the space to support a full UCC session to and in which remote participants may connect and participate. Preferred embodiments comprise both algorithms and hardware accelerators to implement the structures and functions described herein.

These advantages and others are achieved, for example, by a system for simultaneously providing in-room amplification and remote communication during a collaboration session with one or more local participants in a shared space and one or more remote participants. The system includes one or more arrays of microphones and one or more speakers each located in the shared space, at least one microphone system for amplification, an audio processor connected to the microphone system for amplification, the one or more arrays of microphones and the one or more speakers, and a computer connected to the audio processor. The one or more arrays of microphones are configured to receive room audio signals from the local participants and the one or more speakers are configured to output audio signals to the local participants. The at least one microphone system for amplification is located in the shared space. The computer is configured to output audio signals received from the audio processor to the one or more remote participants over the Internet through one or more unified communication clients (UCCs) and to receive remote audio signals over the Internet from the one or more remote participants through the one or more UCCs. The audio processor is configured to capture audio from the local participants using the one or more arrays of microphones, to receive and amplify audio signals from the microphone system for amplification where the amplified audio signals are amplified for in-room audio amplification in the shared space, to output the amplified audio signals to the one or more speakers in the shared space, to output audio signals from the microphone system for amplification and the one or more arrays of microphones to the computer to send the audio signals to one or more remote participants over the Internet, to receive the remote audio signals from the computer, and to output the remote audio signals to the one or more speakers in the shared space.

These advantages and others are further achieved, for example, by a method for simultaneously providing in-room amplification and remote communication during a collaboration session with one or more local participants in a shared space and one or more remote participants. The method comprises capturing audio from the local participants using one or more arrays of microphones located in the shared space, receiving and amplifying audio signals, via an audio processor, from at least one microphone system for amplification, where the amplified audio signals are amplified for in-room audio amplification in the shared space, outputting the amplified audio signals to one or more speakers in the shared space, outputting audio signals from the microphone system for amplification and the one or more arrays of microphones to a computer to send the audio signals to the one or more remote participants over the Internet, receiving remote audio signals from the computer, and outputting the remote audio signal to the one or more speakers in the shared space.

BRIEF DESCRIPTION OF THE DRAWINGS

The preferred embodiments described herein and illustrated by the drawings hereinafter be to illustrate and not to limit the invention, where like designations denote like elements.

FIGS. 3a and 3b are, respectively, prior art illustrative diagrams of a public address system and a remote UCC&C session installed in a typical presentation room.

FIGS. 4a and 4b are, respectively, prior art illustrative diagrams of a public address system and a remote UCC&C session installed in a typical education classroom.

FIG. 5 is, respectively, prior art illustrative diagram of beamformer microphone array and a voice lift system installed in a typical presentation room.

FIG. 6 is, respectively, prior art illustrative diagram of virtual microphones distributed in the shared space.

FIGS. 6a and 6b are concept illustrations of improved secondary echo processing.

FIG. 9 is a structural and functional diagrams of the audio system incorporating the audio processor and the supporting devices, according to an embodiment of the present invention.

DETAILED DESCRIPTION

Figure 1:
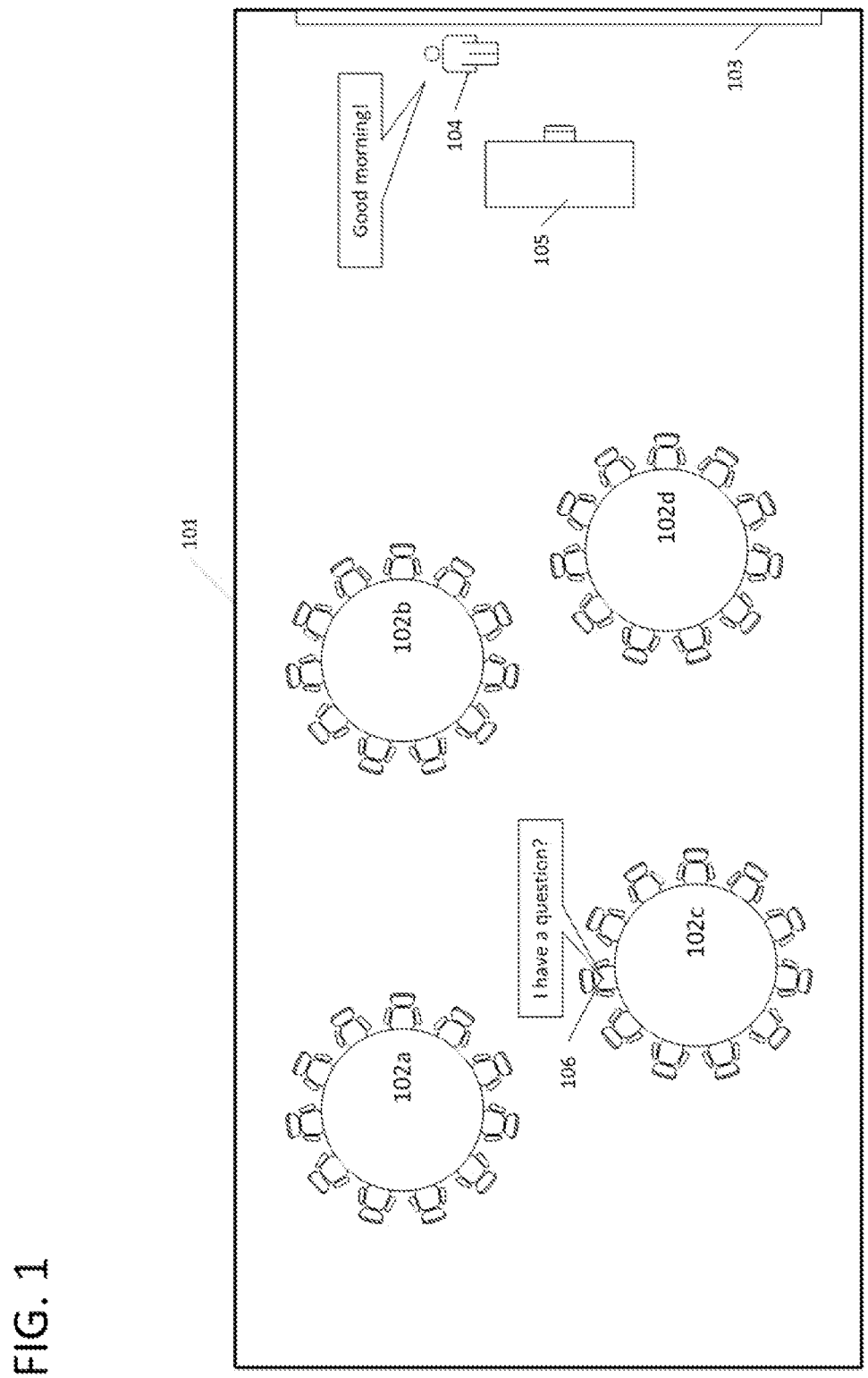
FIG. 1 is a diagrammatic illustration of a typical shared space used as a presentation room.

The present invention is directed to apparatus and methods that enable groups of people (and other sound sources, for example, recordings, broadcast music, Internet sound, etc.), known as "participants or students", to join together over a network, such as the Internet or similar electronic channel(s), in a remotely-distributed real-time fashion employing personal computers, network workstations, audio conference enabled equipment and/or other similarly connected appliances, often without in person face-to-face contact, to engage in effective audio conference meetings or remote classroom education sessions that utilize multi-user rooms (spaces) with distributed participants or students while also providing in-room amplification to a facilitator (teacher) through the use of an integrated wired/wireless microphone that may be attached or worn by the facilitator (teacher).

Advantageously, embodiments of the present apparatus and methods afford an ability to concurrently 1) provide all participants an end user experience having all sound sources transmitted to the remote end with significantly improved clarity and definition, regardless of their location in the room, while 2) providing in-room amplification to a facilitator (teacher) to provide clear and optimum voice audio quality for all in-room and remote conference participants.

A notable challenge to providing in-room voice amplification without the constraints of complex microphone and speaker logic steering in conjunction with maintaining an acoustic separation distance between active microphones and speakers concurrently while providing for full room microphone coverage for both the participants and the teacher is ensuring the elimination of acoustic feedback that would normally result when the speakers providing the voice amplification feedback into the microphone array providing the full room coverage.

Yet another challenge to providing in-room voice amplification in conjunction with whole room pickup and UCC conferencing is the ability to have the presenters voice be both sent to the UCC client for the remote participants to hear while also sending the presenters voice to the speakers to be amplified within the room. Typical sound systems for UCC by design have echo cancellation features which are intended to prevent remote sounds from UCC from being picked up by the microphone system. This is to prevent the remote participants voices being heard by the remote participants, typically described as an echo. This cancellation takes signals that are to be output by the speakers within the room as a reference signal and as the in-room microphone system picks up the output from the speakers as well as the in-room participants the audio processing will remove the speaker output from the microphone pickup signal. This means that if a presenter were to have a microphone intended for amplification their speech would be cancelled out of the pickup and as such not get to the remote participants.

A "conference enabled system" in this specification may include, but is not limited to, one or more of, an combination of device(s) such as, UCC (unified communications) compliant devices and software, computers, dedicated software, audio devices, cell phones, a laptop, tablets, smart watches, a cloud-access device, and/or any device capable of sending and receiving audio signals to/from a local area network or a wide area network (e.g., the Internet), containing integrated or attached microphones, amplifiers, speakers and network adapters. PSTN, Phone networks etc.

A "microphone" in this specification may include, but is not limited to, one or more of, any combination of transducer device(s) such as, condenser mics, dynamic mics, ribbon mics, USB mics, stereo mics, mono mics, shotgun mics, boundary mic, small diaphragm mics, large diaphragm mics, multi-pattern mics, strip microphones, digital microphones, fixed microphone arrays, dynamic microphone arrays, beam forming microphone arrays, and/or any transducer device capable of receiving acoustic signals and converting to electrical signals, and or digital signals which may be connected through wired or wireless industry standard technologies.

A "communication connection" in this specification may include, but is not limited to, one or more of or any combination of analog signal connections; local communication interface(s) such as memory buffer(s), queues, named pipes, etc.; digital network interface(s) and devices(s) such as, WIFI modems and cards, Internet routers, Internet switches, LAN cards, local area network devices, wide area network devices, PSTN, Phone networks etc.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

A "desired sound source" in this specification may include, but is not limited to, one or more of a combination of audio source signals of interest such as: sound sources that have frequency and time domain attributes, specific spectral signatures, and/or any audio sounds that have amplitude, power, phase, frequency and time, and/or voice characteristics that can be measured and/or identified such that a microphone can be focused on the desired sound source and said signals processed to optimize audio quality before deliver to an audio conferencing system. Examples include one or more speaking persons, one or more audio speakers providing input from a remote location, combined video/audio sources, multiple persons, or a combination of these. A desired sound source can radiate sound in an omni polar pattern and/or in any one or combination of directions from the center of origin of the sound source.

An "undesired sound source" in this specification may include, but is not limited to, one or more of a combination of persistent or semi-persistent audio sources such as: sound sources that may be measured to be constant over a configurable specified period of time, have a predetermined amplitude response, have configurable frequency and time domain attributes, specific spectral signatures, and/or any audio sounds that have amplitude, power, phase, frequency and time characteristics that can be measured and/or identified such that a microphone might be erroneously focused on the undesired sound source. These undesired sources encompass, but are not limited to, Heating, Ventilation, Air Conditioning (HVAC) fans and vents; projector and display fans and electronic components; white noise generators; any other types of persistent or semi-persistent electronic or mechanical sound sources; external sound source such as traffic, trains, trucks, etc.; and any combination of these. An undesired sound source can radiate sound in an omni-polar pattern and/or in any one or combination of directions from the center of origin of the sound source.

A "virtual microphone" in this specification may include, but is not limited to, a microphone system focus point in 2D (x, y) and/or 3D (x, y, z) space. A virtual microphone is a type of object that contains a profile or plurality of profiles where a profile consists of attributes and functions. There can be any number of virtual microphones created, added or removed in real-time. A virtual microphone can be assigned to any number of regions and groups. Sometimes called a "bubble."

A "microphone-zone" in this specification may include, but is not limited to, one or more of, any combination of microphone pickup patterns such as, physical microphones, macro-zones, zones, beams, beam former zones, adaptive zones, omni, cardioid, hypercardioid, supercardioid, lobar, bidirectional, directional, and/or any microphone pickup area and pattern capable of receiving acoustic signals within an arbitrary or defined boundary area, and or position that is directly tied to the physical microphone position.

A "participant" in this specification may include, but is not limited to, one or more of, any combination of persons such as students, employees, users, attendees, or any other general groups of people that can be interchanged throughout the specification and construed to mean the same thing. Who gathering into a room or space for the purpose of listening to and or being a part of a classroom, conference, presentation, panel discussion or any event that requires a public address system and a UCC connection for remote participants to join and be a part of the session taking place.

A "facilitator" in this specification may include, but is not limited to, one or more of, any combination of persons such as presenter, teacher, host, leader, master of ceremonies, or any other general title description of people that can be interchanged throughout the specification and construed to mean the same thing.

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client—server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

A "UCC or Unified Communication Client" is preferably a program that performs the functions of but not limited to messaging, voice and video calling, team collaboration, video conferencing and file sharing between teams and or individuals using devices deployed at each remote end to support the session. Sessions can be in the same building and/or they can be located anywhere in the world that a connection can be establish through a communications framework such but not limited to Wi-Fi, LAN, Intranet, telephony, wireless or other standard forms of communication protocols. The term "Unified Communications" may refer to systems that allow companies to access the tools they need for communication through a single application or service (e.g., a single user interface). Increasingly, Unified Communications have been offered as a service, which is a category of "as a service" or "cloud" delivery mechanisms for enterprise communications ("UcaaS"). Examples of prominent UCaaS providers include Dialpad, Cisco, Mitel, RingCentral, Twilio, Voxbone, 8×8, and Zoom Video Communications.

With reference to FIG. 1, shown is illustrative of a typical shared space 101 which is configured for a presentation or talk to a group of individuals. Shared space, presentation room, classroom and room 101 can be interchanged and be construed to mean the same thing throughout the specification. The shared space 101 can be any size, volume and shape and be within the intended use of the preferred embodiments. There are notionally four table and chairs 102a, 102b, 102c and 102d illustrated in the room 101, which any one or number of the chairs 102a, 102b, 102c and 102d can be filled with attendees. It should be noted that only the chairs 102a, 102b, 102c and 102d are shown for clarity purposes, however we can assume that the chairs 102a, 102b, 102c and 102d are all completely filled or somewhere in between to partially filled. The shared space 101 has a presentation desk 105 at the front of the room. A facilitator 104 is located at the front of the room 101 who would be the primary talker addressing the shared space 101. The person 104 may be a presenter, teacher, lecturer, facilitator or any person who is the primary talker in the room 101 which is addressing the attendees. The shared space 101 may have facilitation and display devices 103 located on the walls. There may be any number of facilitation and display devices 103. An attendee 106 sitting at table 102c is asking a question during the presentation. In this scenario each person 104, 106 will need to raise their voice to be heard across the room. Raising one's voice may work in a small, shared space 101. However, it will soon become problematic especially for the facilitator 104 to address and be heard by all the attendees in the shared space 101 as the space gets larger in volume. At a certain size of shared space 101, it may not be practical for the facilitator 104 to communicate and be heard.

Figure 2:
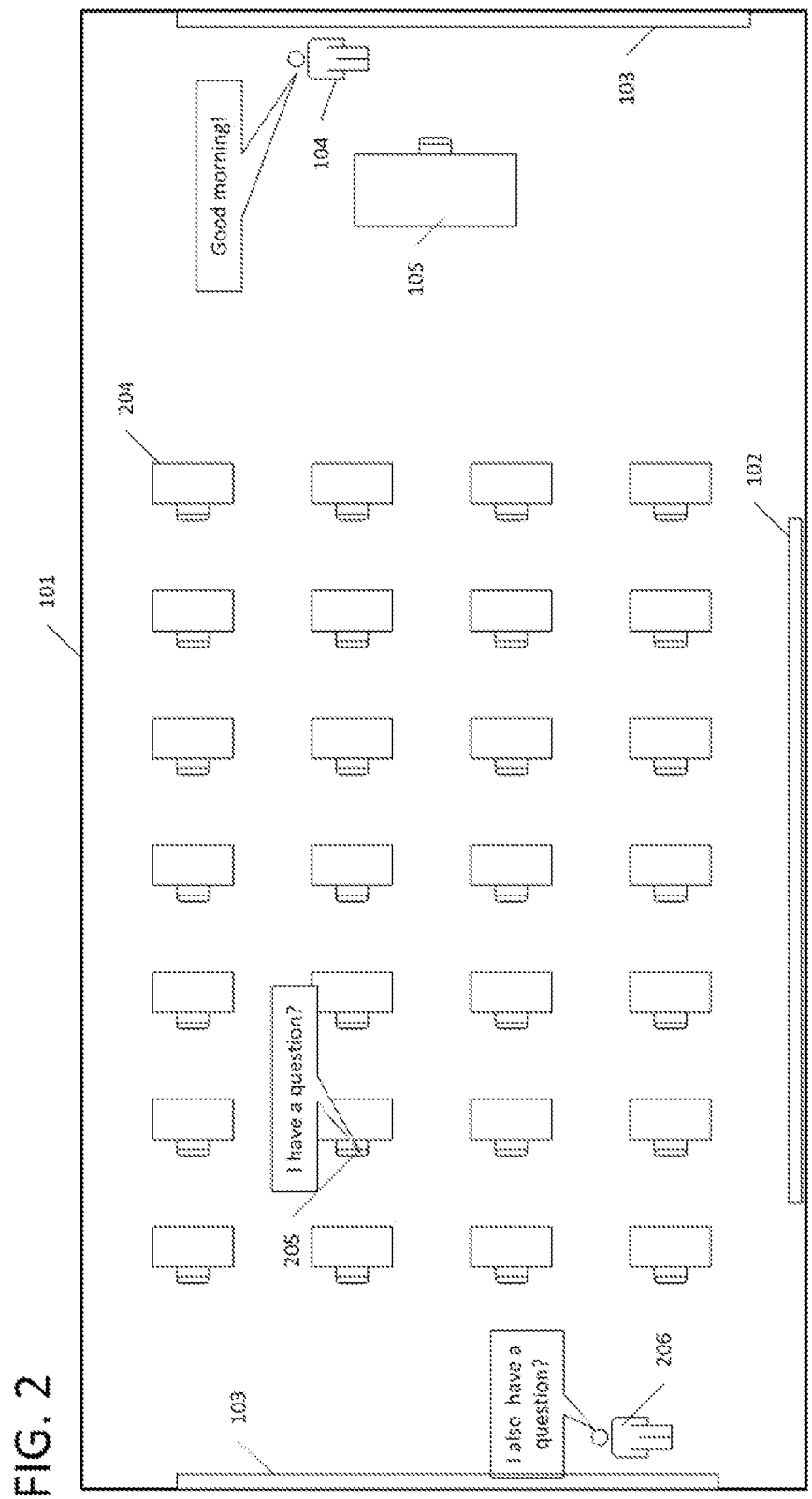
FIG. 2 is a diagrammatic illustration of typical shared space used as an education classroom.

With reference to FIG. 2, shown is another example of a shared spaced 101 configured as classroom. Replacing the chair and table 102a, 102b, 102c and 102d, is a larger number of student desks 204. As per FIG. 1 the desks are assumed to have any number of students sitting at them and are shown empty only for clarity purposes. Person 104 in this instance is a teacher who will be the primary talker in the classroom 101. The teacher 104 will need to talk sufficiently loudly so that all students can hear their voice clearly throughout the room. Two students 206, 205 both have questions and will need to get the teachers 104 attention to ask their question and then they will also need to talk sufficiently loud to be heard above the day to day classroom 101 noise.

The situations illustrated in FIG. 1 and FIG. 2 are not ideal as the facilitator (e.g., a teacher) 104 is usually not being heard clearly throughout the share space 101 due to but not limited to just the sound loss in a large space, ambient and distraction noises known as undesired sound sources.

With reference to FIG. 3a, shown is a typical prior art implementation by providing a public address (PA) or sound reinforcement (SR) system 301 capability for the purpose of amplifying the facilitators 104 voice through a PA system 301. PA systems 301 are typically configured to support a primary microphone which may be a wired microphone 304 and/or a wireless microphone 305 worn by the facilitator 104 or is attached to their body in such way that the microphone 305 is able to pick up the facilitator's 104 voice, leaving the facilitators 104 hands free. The microphone signal 306 can be transmitted wirelessly or through standard wired connection 306 to the PA system 301. A PA system 301 will typically amplify the audio signal received from the microphones 304, 305 and transmit the amplified signal 307 to speakers 303 located anywhere in the room 101. The result is that the facilitators 104 voice is amplified well above the facilitators 104 natural voice and output through the speakers 303 at a sufficiently high level 302 that all attendees can hear the facilitators 104 voice clearly. Typically, in this type of system the amplified voice is of sufficient volume to not localize to the facilitator 104, but potentially to the speakers 303. The simple PA system 301 while helping the attendees in the room 101 to hear the facilitator's 104 voice do little to support the full room microphone coverage required to pick up attendees. Attendee 106 at table 102c will still not able to be heard clearly in the room 101 by the other attendees and the facilitator 104.

With reference to FIG. 3b, illustrated is a more complex in-room 101 PA system 313 implementation in which the PA system 313 comprises an audio PA capability and a computer system to support complex UCC software and communication programs through the Internet 312. The PA system 313 incorporates a plurality of distributed microphones 310 at each table 102a, 102b, 102c, and 102d. If participant 106 has a question they would typically active their microphone 310 manually and speak into the microphone 310 at which point the PA and computer system 313 could do two things. If configured to do, so the PA and computer system would amplify 302 the participants 106, 104 voice out the speakers 303. And if further configured to do so, the PA and computer system 313 would transmit any active microphone 305, 304, 310 signals to the UCC client via the Internet 312 to the remote participants 311 connected to the same UCC client connection. With this configuration a larger number of the room 101 participants can be heard at the remote client end and if configured via the PA and computer system 313 speakers 303. A limitation of this configuration is that a participant has to have direct access to or be very closely located to a microphone 310, 304, and 305 in the room 101. Another limitation of this configuration is that the amplified signals out of the speakers 303 within the room will potentially be picked up by the microphones 106, 305, 304 and 310 such that there is a doubling of the voice (initial persons voice and the amplified version of it) or an echo cancellation function would be in place and no voices would transmit to the remote participants 311 via the UCC client on the computer as any outbound speaker signals are cancelled out from the microphone pick up. Participant 308 is not able to be heard locally in the room 101 or through the UCC client at the remote location 311. Forcing participants to a specific microphone 310 location can be problematic in multifunction user spaces and classrooms 101, where the supporting (collaboration, display, presentation and/or teaching aids) 102 are usually not located near a microphone 310 and are located on the walls at the edge or outside of microphone coverage zones. Outfitting a room 101 with enough wired or wireless microphones 305, 304, 310 is complex, expensive and not feasible in many situations.

With reference to FIGS. 4a and 4b, illustrated are this point in a classroom environment 101. A classroom 101 typically has a large number of desks 405. A typical situation is illustrated in FIG. 4a where the students desks are not configured with a student microphone. FIG. 4b illustrates a scenario where the student's desks are configured with a microphone 406. To install and configure many dozens of microphones 406 is a very complex and costly undertaking. Student 404 will be part of the immersive experience for the remote students 311 as they have access to a collocated microphone 406 at their desk. The student 403 on the other hand will not be heard by the remote students 311 although they are in the classroom and located at a collaboration device 102. Freedom of movement by the students is compromised as the room 101 does not have full room microphone 406 coverage, and the remote students 311 will have a reduced learning experience, potentially feeling disconnected from the overall classroom experience. In this example the teacher 104 is able to be heard by all the students because their voice is amplified 302 through the PA and computer system 313 and transmitted to the remote students 311 through the UCC client application. A limitation of this configuration is that the amplified signals out of the speakers 303 within the room will potentially be picked up by the microphones 406, 305, 304 such that there is a doubling of the voice (initial persons voice and the amplified version of it) or an echo cancellation function would be in place and no voice would transmit to the remote participants 311 via the UCC client on the computer as any outbound speaker signals are cancelled out from the microphone pick up.

With reference to FIG. 5, illustrated is the concept of what is known in the art as an in-room voice lift strategy. The room 101 is configured with a beamforming microphone array 508 which is connected 503 to a sound processor 502. The sound processor 502 provides sound source targeting, audio processing and the necessary amplification for the speakers 303. The sound processer in this example is connected 504 to a pair of speakers 303 located at the back of the room. The sound processer 502 has been configured to three (3) beamformer microphone 508 pickup zones 509a, 509b, 509c. The sound processor may or may not be configured to or connected to a UCC client for remote participant connection. Located in the room 101 are participants located at tables 501 and participant 505 who is free roaming at a collaboration device 102. The facilitator 104 is located at the front of the room 101 within beamformer microphone zone 509c.

Voice lift is different than voice amplification. Voice amplification is an application of sufficient gain applied to the desired sound source such as a facilitator 104 using a microphone. The amplification provided by the PA system 301 is designed to raise the facilitators 104 voice well above any background noise or other sounds present in the environment such that the facilitators 104 voice is clearly heard without difficulty. There is a clear amplification effect taking place as the facilitators 104 voice will become localized to the speaker 303 location in the room. Voice lift is the process of providing just enough amplification to the facilitator's 104 voice to augment their voice in a larger room 101 without the participants perceiving the talkers 104 voice being amplified. In another words the participants would not be able to discern or tell that the facilitators 104 voice is not localized to the facilitator 104 position meaning the speakers 303 in the room will not typically localize the facilitators 104 voice. The participants in the room 101 would hear the facilitators 104 voice clearly without realizing that sound amplification through speakers 303 is taking place. For this type of system to work correctly certain constraints typically need to be maintained such as for example microphone 508 to speaker 303 distance relationships 511. Their needs to be enough separation between the microphone system 508 and the speakers 303 to manage ingress and feedback than could be generated between the speakers 303 and the microphone 508 system. A secondary reason is that the speakers 303 typically need to be placed at opposite ends of the room 101 of the facilitator 104. This makes sense because the speakers 303 are used to augment the natural voice volume of the facilitator 104. The volume 302 of the speaker 303 is controlled and/or configured to a level that maintains natural augmentation of the facilitators 104 voice.

To maintain an appropriate speaker 303 to microphone 508 distance relationship the beamforming array 508 zone 509c is the only zone configured for voice lift. What this means is that as the facilitator 104 moves about the front of the room 101, their voice will be "lifted" and output through the sound processor 502 to the speakers 303. This gives the presenter 104 a level of freedom from having to wear a wireless microphone 305 or use a wired microphone 304. If the facilitator leaves the microphone zone 509c their voice will not be lifted by the sound processor 502. So, although some freedom is gained for the facilitator 104, they are still confined to a preconfigured zone 509c, that maintains the critical distance 511 from the speakers for the voice lift strategy to work. In a more complex arrangement, the room may be arranged with speakers 303 at the front and back of the room 101. This would allow for the lifting of the voice of a participant at the back of the room 101 if they are within a microphone zone 509a, 509b at which point their voices would be vice lifted by speakers located at the front of the room. The system can become very complex to install, configure and optimize for the desired outcome of voice lifting the facilitator 104 in the room and while appearing natural and un-amplified.

It should be further noted that the participants would need to be within a pre-configured coverage zones 509a, 509b, 509c to be picked up by the microphone system 508 and transmitted to a UCC client (not shown) or voice lifted in an appropriately configured system. Participant 505 standing at the collaboration device 102 would not be heard clearly and could be significantly muted at the remote end or voice lifted as they are outside of all preconfigured zones 509a, 509b, 509c.

With reference to FIG. 6, illustrated is a room 101 of any dimension that is volumetrically filled with virtual microphone bubbles 602. Such a system is described in detail in U.S. Pat. No. 10,063,987, issued Aug. 28, 2018 and entitled "Method, Apparatus, and Computer-Readable Media for Focusing Sound Signals in a Shared 3D Space," (referred to herein as "the '987 patent") which is hereby incorporated by reference. The Bubble processer system 912 as presently preferred is set up (but not limited) to measure 8192 concurrent virtual microphone bubbles 602. The illustration only shows a subset of the virtual microphone bubbles 602 for clarity. The room 101 is filled such that from a volumetric perspective all volume is covered with the virtual microphone bubbles 602 which are arranged in a 3D grid with (X, Y, Z) vectors 603 to an individual (X, Y, Z) location 604 in the room 101. By deriving the Process Gain 1113 sourced from each virtual microphone bubble 602 location 603, the exact coordinates 603 of the sound source 804 can be measured in an (X, Y, Z) coordinate grid 603. This allows for precise location determination to a high degree of accuracy, which is limited by virtual microphone bubble 602 size. The virtual microphone bubble 602 size and position 604 of each virtual microphone 602 is pre-calculated based on room 101 size and bubble 602 size desired which is configurable. The virtual microphone bubble 602 parameters include, but are not limited to, size and coordinate position 604. The parameters are utilized by the target (bubble) processor system 912 throughout the calculation process to derive magnitude and positional information for each virtual microphone bubble 602 position 603. With whole room 101 microphone 701 coverage there is no specific need to configure the audio processor 807, and there is not the coverage zone limitations illustrated in the beam former 508 coverage patterns 509a, 509b, 509c or the discrete microphones 310, 406.

Figure 7A:
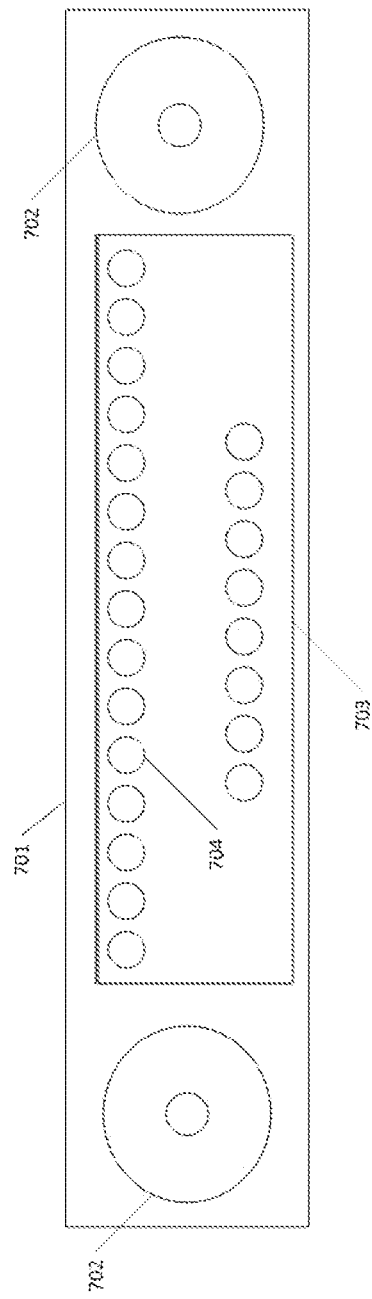
FIGS. 7a and 7B are diagrammatic examples of an embodiment of the microphone and speaker hardware for the present invention.
Figure 7B:
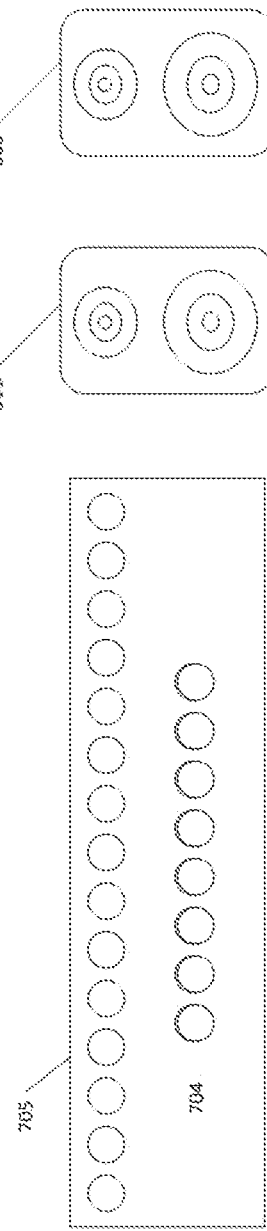

With reference to FIGS. 7a and 7b, outlined are two structural microphone and speaker arrangements that are supported by the preferred embodiment. FIG. 7a illustrates a combined plurality of microphones 704 arranged into a microphone array 703 and a dual speaker 702 system that can be installed in a room 101. The microphones 704 are arranged to create a microphone array 703 that supports the creation of the virtual microphone 602 grid 603 with 1000's of virtual microphones 602 distributed throughout the room 101 as further detailed in FIG. 11 (target processer). The microphone array 703 and the speakers 702 can be collocated in the same chassis 701 or they can be separated out into the individual constituent hardware functions as illustrated in FIG. 7b without affecting the preferred embodiment. Either arrangement is fully supported. The number of microphones 704 is not constrained in maximum number however, there needs to be a sufficient number of at least two (2) or more and even more preferably three (3) or more to form a microphone array 703 to create a virtual microphone 602 bubble map as illustrated in FIG. 6. The number of speakers 303 implemented is not a limiting factor and the only requirement is there must be at least one speaker 303 installed in-room 101 to perform the presenter/teacher 104 voice amplification function and/or allow for the remote participants 311 to be heard in the room 101 during a UCC session. The number of speakers 702, 303 will preferably be determined by the size of the room 101 and the appropriate sound level the room 101 usage scenario is required to achieve.

Figure 8A:
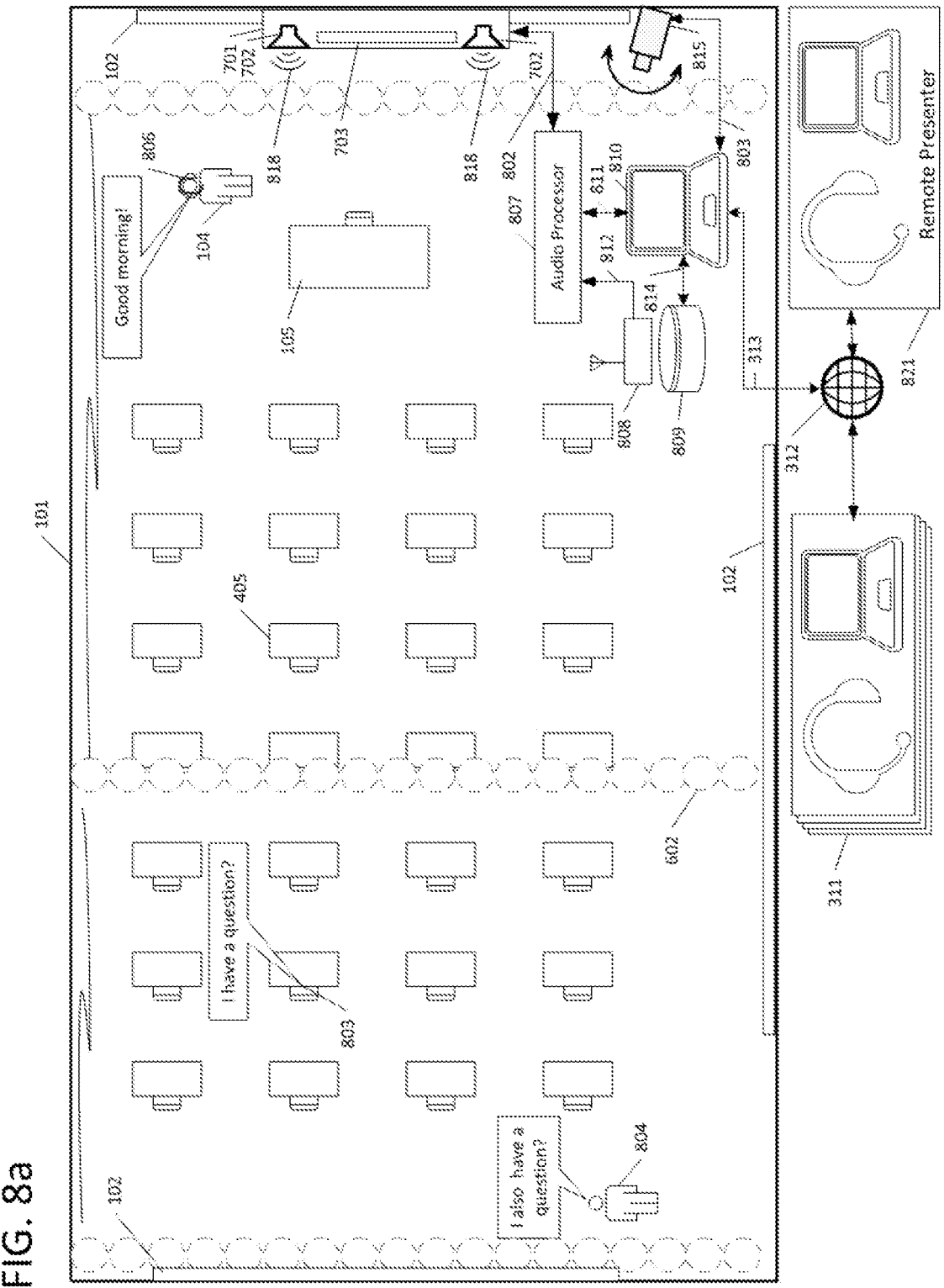
FIGS. 8a, 8b, and 8c are illustrative examples of the preferred embodiment of the preferred invention microphone in a variety of shared spaces.
Figure 8B:
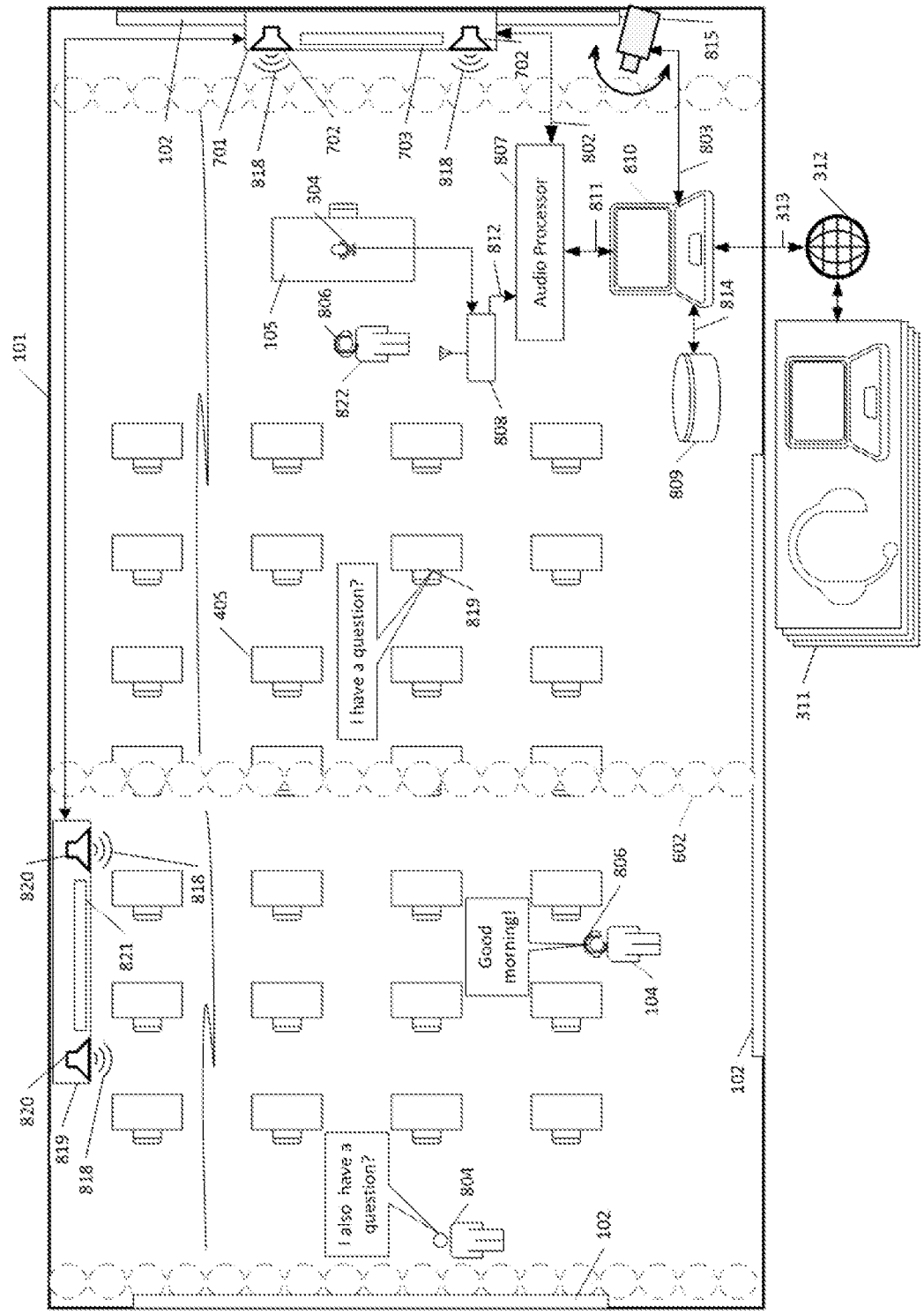
Figure 8C:
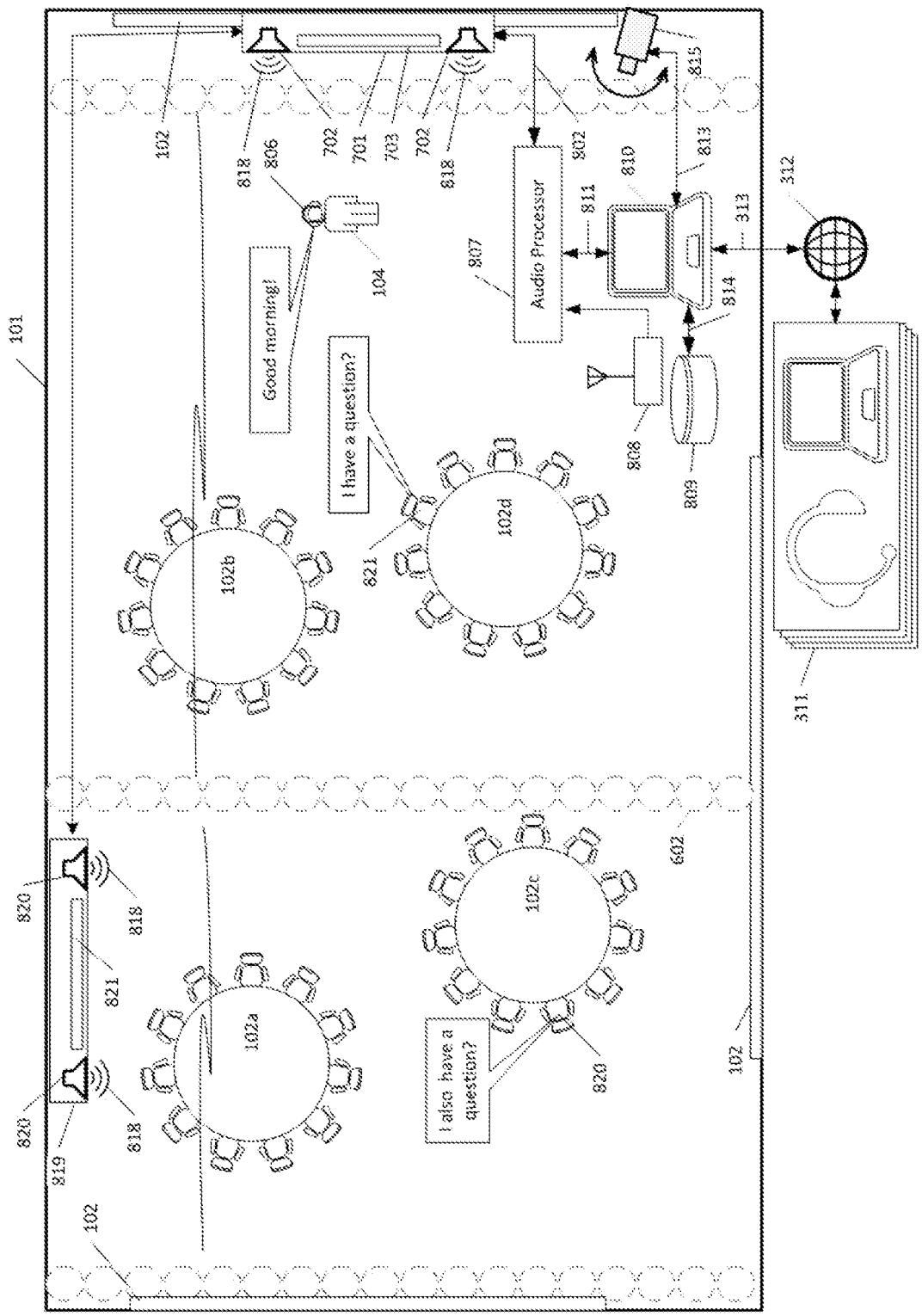

With reference to FIGS. 8a, 8b, and 8c, illustrated are exemplary embodiments of the present invention. As the classroom 101 environment changes to support remote learning for on-line students there has been increased demand put on technology to create an immersive environment for the remote students 311 that goes beyond just being able to hear the teacher 104 consisting of full video display 102, camera 815 and audio systems 807 integration. To have the remote participants 311 to be able to hear clearly in-room 101 student questions and conversation is becoming not just a nice to have but a must have expectation for remote learning students 311. In addition, class sizes are getting larger putting larger physical oral demands on the teacher 104 to speak louder while maintaining full access to and mobility throughout the classroom 101, to access students, teaching aids and collaboration devices 102 that tend to be at the room boundary creating challenges for traditional microphone systems in the current art to provide the necessary room 101 coverage.

FIG. 8a illustrates a classroom 101 that has a teacher's desk 105 at the front of the classroom 101. The classroom 101 may have any number of student desks 405 installed, which are populated with students. The student desks 405 are shown to be empty for clarification purposely only and it can be assumed that all or any number of the student desk 405 may contain students at any given time. The students through the course of the class are not confined to their desks 405 and may need to move about the classroom to access the collaboration devices 102 and teaching aids. Students will typically communicate sitting, walking and moving about so it is imperative that all conversations are captured regardless of the location of any individual in the room 101. The classroom 101 has available any number of collaboration devices 102 in the room to support the content being taught.

The preferred embodiment consists of an integrated audio microphone system comprised of a microphone array and speaker system 701 connected to an audio processor 807, wireless microphone/discrete microphone 806 connected to a wireless transceiver 808 which is also connected to the audio processor 807, and a computer 810 which is connected to the audio processor 807. The microphone array and speaker system 701 may be configured as a microphone and speaker bar or other type of geometry. The computer 810 is connected to a storage medium 809 and to the Internet 312 to support remote communication through a UCC client. It should be noted that for in-room 101 voice amplification only, the computer 810 is not required and is optional. If the teacher would like to establish a remote connection through a UCC client a computer 810 or another UCC client processor can be connected to the audio processor 807 to supply that functionality.

The integrated audio microphone system when connected to a computer 810 is configured to provide in-room 101 sound amplification of the teacher 104 or of any person 104 that has access to a configured microphone 806 connected to the audio processor 807 for the students while also providing the remote students 311 with a continuous clean audio stream consisting of the teachers voice 104 and full room 101 audio pickup of the student's questions and dialog regardless of their location or motion in the room 101. The students should not be required to configure or be expected to manually interface with microphone system 703 for the purpose of turning the microphones on/off, required to stand in certain locations to access a microphone, or be expected to communicate in certain directions based on microphone placement and configurations. In effect, the students should be able to concentrate on their schoolwork and the education program being taught without consideration or adaptation to the installed technology. The teacher 104 may need to have control of their microphone system 806 and should preferably have the option to adjust for volume level and muted state (on/off) of their wireless microphone 806.

The teachers 104 wireless microphone 806 is connected to a wireless transceiver 808 which is connected 812 to the audio processor 807. The audio processor 807 is responsible for managing the input audio signal data 802 from the microphone array 703 and for providing the output audio signal to the in-room speakers 702. In this illustrative embodiment the microphone array 703 and the two speakers 702 are co-located in a single chassis making up microphone array and speaker system 701 (e.g., a microphone and speaker bar) combination unit. It should be noted that there are no constraints with regards to the preferred embodiment for microphone array 703, and speakers 702 placement, separation or special mixing and active gating on/off requirements.

The audio processor 807 channels the teachers 104 microphone audio input signal 812 and the microphone array and speaker system 701, microphone array 703 input signal 802 to the appropriate signal outputs 811, 702 which may be streamed concurrently or individually selected based on the current room usage scenario.

In no particular order, Scenario 1 consists of providing in-room 101 amplification for the teacher 104. This occurs by routing and processing through the audio processor 807 the teacher 104 microphone 806 signal 812 to the speakers 702 located in the speaker and microphone bar 701 for the purpose of providing an amplified 818 audio signal of the teachers 104 voice. Note this is an amplified audio signal and not intended to be "voice lift". The amplified teachers 104 voice is intended to fill the room 101 sufficiently so all students can clearly hear the teachers 104 voice regardless of where they are in the room 101 and above the ambient noise level of the room 101.

Scenario 2 captures the routing of any combination of microphone input signals 802, 812 by the audio processor 807 which is then output 811 to the computer 810 which manages UCC connection software to support remote client 311 connections and also manages storage 809 of all multimedia content captured in the room during recording and UCC sessions 311. The output 811 to the computer 810 contains both the teachers 104 voice captured from the wireless/wired microphone 806 and all other in-room 101 audio captured by the microphone array 703.

Figure 11:
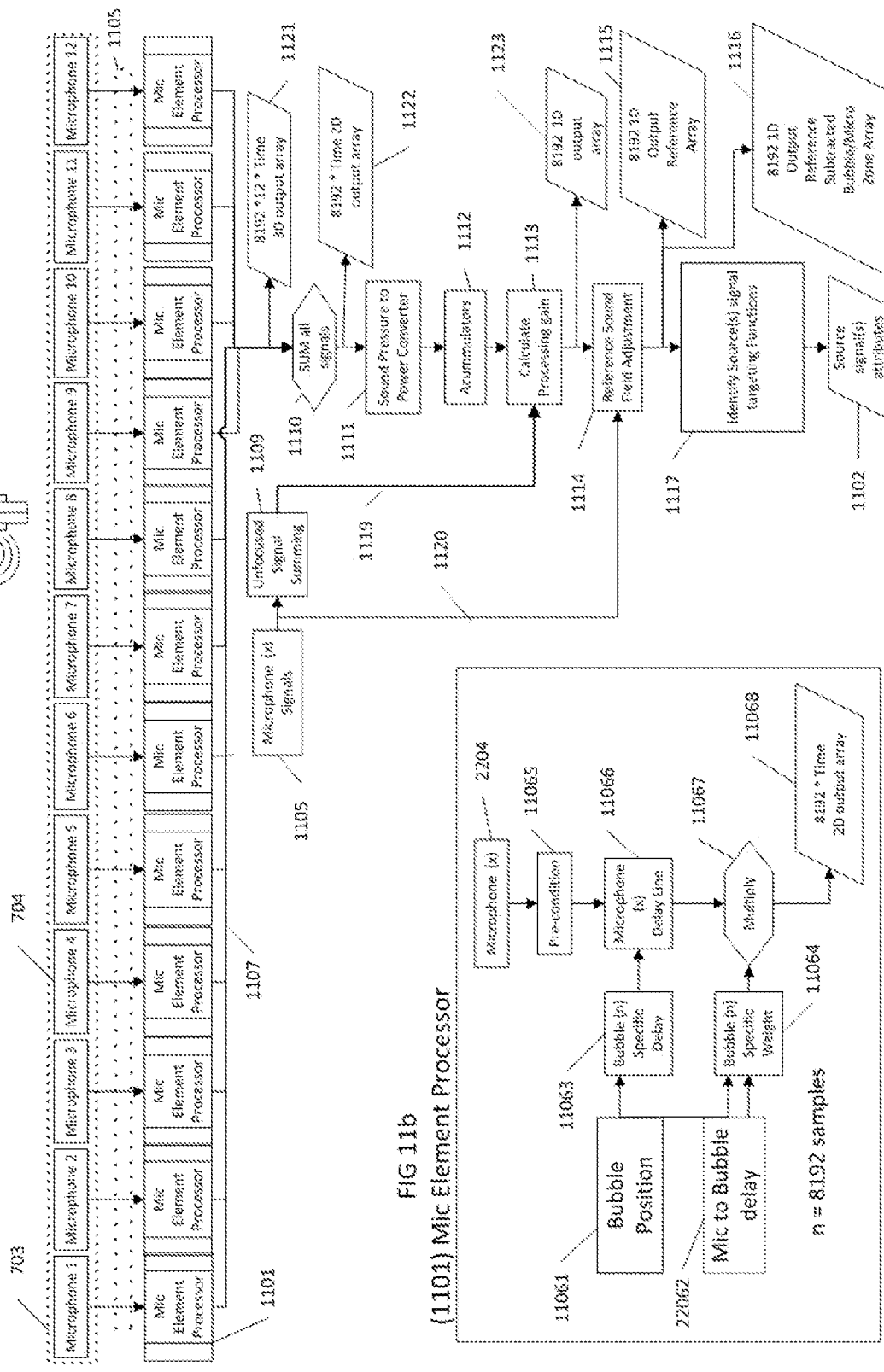
FIGS. 11a and 11b are structural diagrams of the virtual microphone targeting processor.

The audio processor 807 preferably fills the room 101 with thousands (1000's) of virtual microphones 602 as further described in FIG. 6 and FIG. 11, respectively. FIG. 8a only illustrates a sampling of the virtual microphones 602 that fill the room 101. In the preferred embodiment, the entire room 101, or at least the portion where desks 405 are located, is evenly filled with virtual microphones 602. Because the classroom is evenly filled with virtual microphones 602, every student in the classroom 101 can be heard clearly by the remote students 311. Student 804 standing at a collaboration device can work freely without consideration of being located near a physical discrete microphone 304 or located within a beamformer zone that cannot be seen to help guide the students to where they can or cannot speak. Student 803 shares the same freedom to speak and be heard, because the virtual microphones 602 evenly cover the whole room 101 in all dimensions (i.e., X, Y, Z).

The remote students 311 are connected to the Internet 312 to the UCC client session instantiated by the teacher 104. It should be noted that the remote students 311 are able to fully hear and communicate with the classroom 101. The teacher 104 in this example is responsible for configuring and arranging the settings on the UCC client software for the purpose of establishing the session rules and overall settings.

Also illustrated is a $2^{rd}$ presenter 821 who is located remotely. The $2^{nd}$ presenter 821 will be heard through the speakers 702 and can be configured to be displayed on any of the suitably appropriate collaboration devices 102 located in the room through the UCC client or computer 810 operating software.

FIG. 8b illustrates another exemplary embodiment of the present invention by adding one or more second microphone and speaker systems, such as second microphone array and speaker system 819 (and that supports the forming of virtual microphones as per the first microphone array and speaker system 701). The second microphone array and speaker system 819 shown contains a pair of speakers 820 and a microphone array 821 and may also be configured as a microphone array and speaker bar, or in some other geometry. It should be noted that the second microphone array and speaker system 819 may only be a microphone array 821 without speakers 820 or the inverse, a speaker bar 820 without microphones 821, depending on the configuration required. The second microphone and speaker system 819 is used to support a larger room 101 that would be unsuitable for the single microphone array and speaker system 701. The microphone and speaker bar 819 performs the same function as the microphone and speaker bar 701. The microphone array and speaker systems 701, 819 share room coverage responsibilities. In the case of providing teacher 104 sound amplification any combination of microphone array and speaker systems 701, 819 can be used to provide sound amplification 818 in the room 101. Any number of wireless/wired microphones 806, 304 can be supported based on the selected standard industry microphone connection unit 808 capabilities and routed to be amplified out the speakers 702, 820. A second teacher 822 is in the classroom 101 and is wearing a wireless microphone 806 which connects to the microphone connection unit 808. A wired microphone 304 located on the desk 105 is also connected to the microphone connection unit 808. Any or all microphones 304, 806 that are connected to the microphone unit 808 are able to be configured in the audio processor 807 to be the source signal 812 for the in-room 101 amplification and/or the remote UCC remote communication as needed.

FIG. 8c further illustrates the preferred embodiments of the audio system implementation installed in a conference room 101 providing the full functionality of in-room amplification and UCC client support for remote users 311 demonstrating the flexible and non-limiting application of the technology. The hardware and supporting infrastructure have been reduced in complexity and cost to significantly reduce installation costs and time into environments where it would have been cost prohibitive to do so before.

With reference now to FIG. 9, shown is a structural and functional diagram of the audio system incorporating the audio processor 807 and the supporting devices according to an embodiment of the present invention. The audio processor 807 is configured to process and route audio from the in-room microphone array 703 and the microphone system for amplification of the (Presenter microphone) 914 to the computer or appliance 810 running a UCC application and attached peripherals such as, but not limited to a display 102 and a camera 815 such that the audio from within the room 101 is made available through the Internet 312 to one or more remote participants 311 connected with a UCC client to the same session. The audio processor 807 is further configured to process and route audio from the one or more remote participants connected to the same session as the room 101 via the Internet 312 through the computer or appliance 810 and attached peripherals such as, but not limited to a display 102 and a camera 815 such that the audio from the one or more remote participants 311 can be heard from the speakers in the room 702 by the occupants in the room 104 and 804. The audio processor 807 is even further configured to process and route audio from the microphone system for amplification (presenter microphone) 914 to the computer or appliance 810 running a UCC application and attached peripherals such as, but not limited to a display 102 and a camera 815 such that the audio from within the room 101 is made available through the Internet 312 to one or more remote participants 311 connected with a UCC client to the same session while concurrently sending the audio from the presenter microphone system 914 such that it is amplified for the in-room 101 participants to hear 104 and 804 through the speakers 702.

Audio from the one or more remote participants 311 connected to the same UCC session as the room 101 is routed through the Internet 312 to the computer or appliance 810. The computer or appliance 810 sends the audio from the remote participants along with any other sounds output from said computer to the audio processor. This audio is routed to an amplification block 906 to increase or decrease the amplitude of the signal. This amplification block may or may not be synchronized with the computer or appliance 810 volume level. Once the signal has been amplified it is then sent to the mixing block 905. This mixing block combines the signal from the computer or appliance 810 (Its own sound as well as the sound from the one or more remote participants 311) with the signal from the amplification block 903 (From the microphone system for amplification 914). This combined signal is then sent to the speaker out block 904 which sends the signal to the in-room 101 speakers 702 for the in-room 101 participants 104, 804 to hear and also sends a reference signal to the audio processing block 907 to be used as a reference signal for echo cancellation.

Audio from in-room 101 microphone array 703 picks up sounds from within the room 101 and sends the signals to the audio processor 807 mic in 908. The mic in 908 sends the signals to the target process block 912. This block defines how the microphone array is to be set up and processed. Examples are, but not limited to, an audio processor 807 capable of creating a virtual microphone 602 bubble map as illustrated in FIG. 6, an audio processor 807 capable of creating a beamformer with varying lobes, an audio processor 807 capable of switching to the best microphone as in the case of desk mounted or ceiling mounted microphones or other configurations of microphone arrays. The signal is then sent to the audio processing block 907 where echo cancellation is performed with the reference signal from speaker out 904, gain functions to increase or decrease the gain and any other audio processing such as, but not limited to, noise reduction, smoothing, dereverberation filters, high pass filters, low pass filters, spectral subtraction or equalization. The processed signal is then sent to the mixing block 915 which combines the signal from the microphone system for amplification 914 to 909 to then be sent to the connected computer or appliance 810 intended for the UCC connection.

Audio from the microphone system(s) for amplification 914, be they wireless 806 (examples being, but not limited to, handheld microphone, headset microphone, ear-set microphone, pendant microphone or lapel style microphone, connected to a transmitter 911 and received by a receiver 808) or wired 913 (examples being, but not limited to, handheld microphone, gooseneck microphone or podium microphone) are connected to the audio processor 807. The audio processor 807 splits 910 the signal into two paths. One path is intended for the remote UCC participants 311 to hear and the second path is intended for in-room 101 amplification via the speakers 702 for the in-room 101 participants 104 and 804 to hear.

The path for in-room 101 amplification is routed to a threshold block 902. This threshold block 902 may or may not apply logic to determine if the signal is above a certain threshold by means of a gating function, which for example may be defined as but not limited to a defined energy level, or a voice activity detector circuit. If the signal meets or exceeds the threshold level of parameters that is set, then the signal is routed to the GC (gain control) amplification block 903. (Gate or gating functions may have minimum on value, minimum on time, minimum off threshold, attack, hold, and/or range, or any combination thereof.). The GC amplification block applies gain (either a set level or a configurable level) to the signal. The signal is then routed to the mixer block 905 where this signal is combined with the signal coming from the computer or appliance 810 intended for the UCC connection (the signal from the computer or appliance 810 could be either sound from the one or more remote participants or sounds from the computer or appliance itself 810 or both). The mixed signal is then sent to the Speaker out block 904, which sends the signal to the in-room 101 speakers 702 for in-room 101 participants 104, 804 to hear while also providing the same signal to the audio processing block 907 to be used as a reference signal for echo cancellation.

The path intended for connected UCC participants 311 is routed to a threshold block 909. This threshold block 909 may or may not apply logic to determine if the signal is above a certain threshold by means of a gating function with a defined energy level or a voice activity detector circuit. If the signal meets or exceeds the threshold level that is set, then the signal may or may not have an additional gain applied (be it positive gain or negative gain to attempt to make the resultant level closely match the level coming from the in-room 101 microphone array 703 to 907). The signal is then passed to a mixing block 915 which combines the signal from the in-room 101 microphone array, 703 to 907, to then be sent to the connected computer or appliance 810 intended for the UCC connection.

The audio processor 807 creates two paths from the microphone system for amplification 914 due to the fact that signals that are output to the in-room 101 speakers 702, for the first path intended for amplification, are also cancelled out from the pickup of the in-room 101 microphone array 703 to 907 at the audio processing block 907 with the reference signal from speaker out 904 to audio processing 907. The echo cancellation function in the audio processing block 907 is normally intended to remove audio emitting from the in-room 101 speakers 702 so that remote participants 311 do not hear an echo of their own voices or other remote sounds. This cancellation removes all audio that is emitted from the in-room 101 speakers 702 and as such would remove sounds from remote participants speech and computer sounds, sounds form the in-room 101 computer or appliance 810 and the signal from the in-room 101 presenter via microphone system for amplification 914 or room microphone array 703. If the second path were not available, then the presenter 104 would not be heard by the one or more remote participants due to the echo cancellation in block 907.

A further capability of the audio processor 807 is to combine the signals from the computer or appliance 810 with all of the microphone pick up systems 914 and 703 for the purpose of recording all inbound and outbound audio. Most UCC clients have the ability to record a session's audio, camera feeds used in a session (for example, camera 815) as well as any screens that are shared remotely. Some room configurations, especially educational ones, prefer to have independent recording of sessions and the record out block 809 is where all inbound and outbound audio can be captured. A further configuration that uses the record out block 809 is one where there is no UCC session or remote participants 311, but in-room 101 amplification and whole room pickup are still desired to be recorded. The split 910 of the microphone system for amplification 914 permits the amplification of the presenter 104 (which would be cancelled out from any pickup 907 due to the reference signal from speaker out 904) as well as permitting the presenters signal to be sent to the rec out block 809 via threshold block 909 and mixing block 915.

Figure 10:
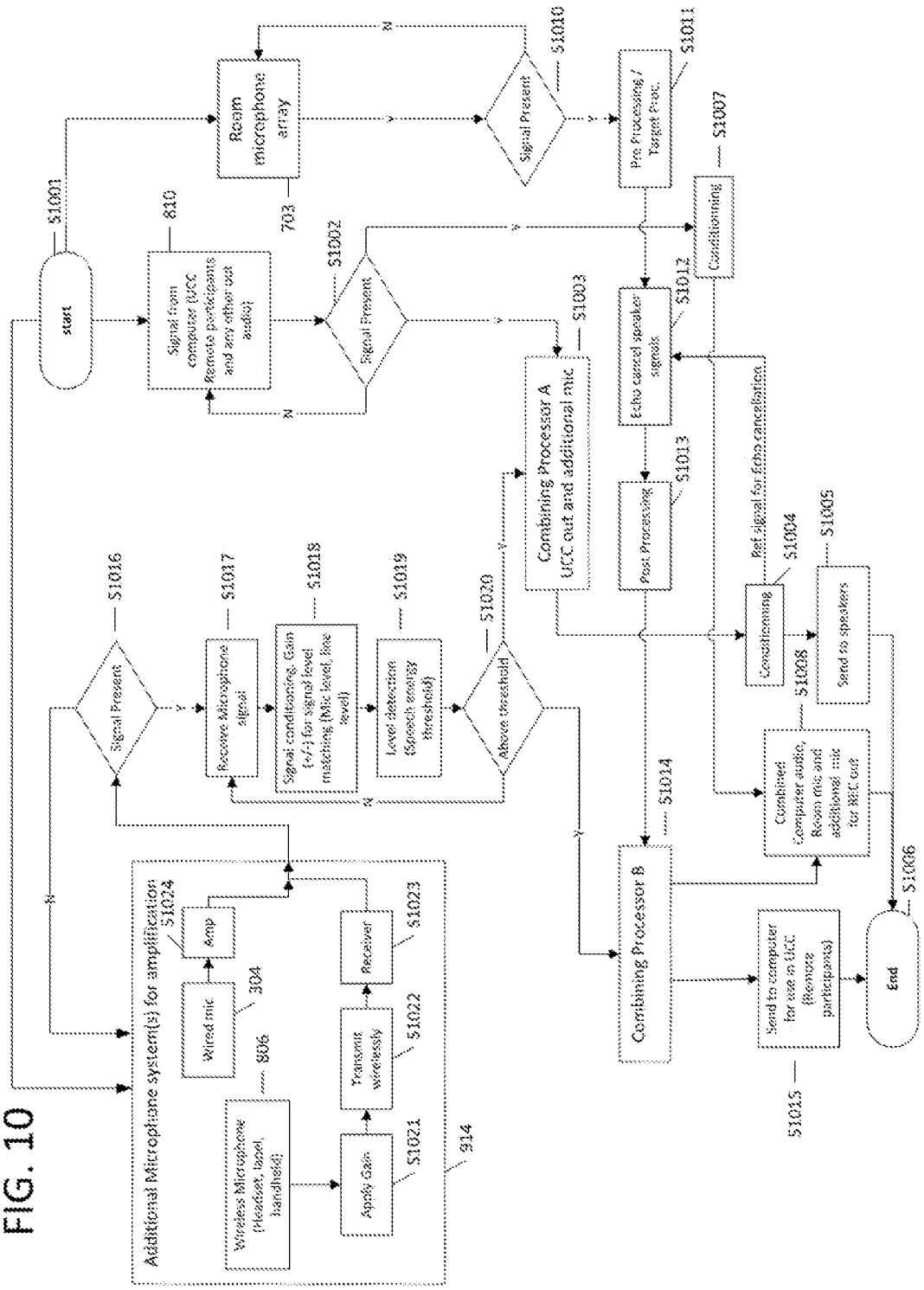
FIG. 10 is a logic flowchart of the audio processor functionality.

With reference to FIG. 10, illustrated is the logic of the audio processor functionality. The start S1001 has three paths, one being signals from the additional microphone system(s) for amplification 914, another being signals from the computer or appliance intended for the UCC connection 810 which also includes and signals from remote participants 311, and a final path from the in-room 101 microphone array 703.

The first start S1001 path begins at the additional microphone system(s) for amplification 914 from either a wireless microphone 806 or a wired microphone 304 for the purpose of amplification within the room 101. For a wireless microphone 806 the raw microphone signal typically has gain applied S1021 before it is wirelessly transmitted S1022. This transmission could be, but is not limited to, RF or infrared transmission. The transmission is then picked up by a receiver S1023 which is connected to the audio processor. A wired microphone 304 is typically connected to an amplifier S1024 which may or may not apply gain to the signal prior to outputting it to the audio processor.

If there is a signal present S1016 from the additional microphone system for amplification 914 then it is received into the process at step receive microphone signal S1017 otherwise wait until the additional microphone for amplification 914 generates a signal. Once a microphone signal is received S1017 then the signal is conditioned S1018 by applying a positive or negative gain factor to match the signal levels expected. Examples are, but not limited to, applying negative gain to a line level signal if a mic level signal is expected or applying a positive gain if mic level is input but line level is expected or applying no gain at all as the signals are matched.

The conditioned signal is now evaluated to determine if it has a valid level of energy S1019. If the level threshold is set to low (or set to zero to not have a threshold) then there is a risk that speech from other participants in the room 814 without an additional microphone for amplification 914 will be picked up by the additional microphone for amplification 914 that the presenter is wearing or holding 104 and as such their low level of pickup will get routed by the audio processor 807 such that an amount of that signal will get amplified out the speakers 702. This signal may not have a perceived amplification to it as it typically would be a low level signal as the other participants 804 typically be extremely close to the presenter 104 with the additional microphone for amplification 914, it however would still make its way as a reference signal for echo cancellation to then have the in-room 101 participants 804 that are picked up by the additional microphone for amplification 914 cancelled out of the pickup of the array 703 once processed by the audio processing block 907. To prevent this accidental cancellation, a threshold or voice activity detection or a combination of the two is applied such that the signal is only passed to the combining processor A S1003 and to the combining processor B S1014 if there is adequate signal from someone speaking directly into the additional microphone for amplification 914.

The second start S1001 path originates from the computer or appliance 810 and could be an audio signal from remote participants 311 (speech and or computer-generated sounds) or generated sound from the in-room 101 computer or appliance 810. This path is monitored for a signal S1002. If there is no signal present then wait for a signal to come from the computer or appliance 810. If there is a signal present then pass the signal to combining step A S1003 as well as the conditioning step S1007.

Conditioning S1007 could take many forms, examples of which are, but no limited to, positive or negative gain to match the level of other signals within the processor intended to be combined at S1008, audio effects to alter the sound, noise removal filters, dereverberation filters, compression filters or no conditioning at all. Once the conditioning has been done the signal is then combined with the other two paths at combining step S1008.

The third start S1001 path originates from the room microphone array 703 picking up sounds from within the room 101. This path is monitored for a signal S1010. If there is no signal present then wait for a signal to come from the room microphone array 703. If there is a signal present then send the signal to the preprocessing step S1011.

The preprocessing and target process step S1011 defines how the microphone array 703 is to be set up and processed as well as any preprocessing prior to echo cancellation S1012. Examples of how the input from the microphone array 703 is processed includes, but not limited to, creating a virtual microphone 602 bubble map as illustrated in FIG. 6 and processing the microphone array 703 audio according to the virtual microphone 602 bubble map, creating a beamformer with varying lobes and processing the microphone array 703 audio according the lobes, switching to the best microphone as in the case of desktop mounted or ceiling mounted microphones, and processing the best microphone audio, or other configurations of microphone arrays. Examples of preprocessing prior to echo cancellation S1012 are, but not limited to, noise reduction, smoothing, dereverberation filters, high pass filters, low pass filters, spectral subtraction or equalization. Once the functions to be performed at the preprocessing and target process step are complete the signal is then echo cancelled at step S1012

The signal from the room microphone array 703 after processing S1011 has an echo cancellation function applied. The signal coming from the conditioning step S1004, which contains the additional microphone for amplification 914 signal and the computer or appliance 810 signal as a reference to be used for the cancellation. Once this step has completed the signals are then post-processed at step S1013.

Post-processing S1013 of the signal is performed prior to sending the signal to the combining processor B S1014. Examples of post-processing are, but not limited to, noise reduction, smoothing, dereverberation filters, high pass filters, low pass filters, spectral subtraction or equalization.

Combining processor B S1014 combines the signals from the additional microphone for amplification 914 path and the signals from room microphone array 703 path so that they can be sent to the computer or appliance S1015 and or to the combining block S1008. At the combining step a positive or a negative gain may be applied to one or both signals to achieve a desired level for both signals. The desired level could be a match in amplitude of the signals or a delta in amplitude of the signals depending on the requirements of the use.

Sending the signal to the computer or appliance S1015 then has the signal sent via UCC to all of the remote participants 311 who are connected to the same session as the in-room 101 computer or appliance S1015, 810. This concludes the path and ends at step end S1006.

Combining processor A S1003 combines the signals from the additional microphone for amplification 914 and the sounds from the computer or appliance 810 which includes the sounds from the connected remote participants 311. The combining processor A S1003 provides amplification to the signal from the additional microphone for amplification 914 such that the presenter's voice is amplified within the room 101 to a desired level. The combining processor A S1003 also amplifies the signal from the computer or appliance 810. The gain for the computer amplification, be it positive or negative, may or may not be synchronized with the volume level that the computer or appliance 810 sets. An alternate gain for amplification, be it positive or negative, would be to take the amplified signal from the additional microphone 914 for amplification, combine it with the signal form the computer or appliance 810 and then apply the same gain to both. This could be synchronized with the volume control levels from the computer or appliance 810 or not. Once the combining processor A is complete the signals are passed to the conditioning step S1004.

The conditioning step S1004 may or may not apply processing to the signal. Examples of conditioning are, but not limited to, equalization adjustments and compression to avoid clipping. Once the conditioning has been applied the signal is sent to the echo canceller step S1012 as a reference signal to be used while also sending the signal to the send to speakers step S1005.

The send to speakers step S1005 outputs the signal to the speakers 702 so that the in-room 101 participants 804, 806 can hear the sound. This completes the path and ends at the end step S1006.

The combined computer audio, room mic and additional mic for rec out step S1008 takes the signal from the combining processor B and the signal from the conditioning step S1007 and combines them so that they are available for a recording function in a separate appliance or computer from that of the audio processor. This combination has all three signal paths combined into one, the additional microphone for amplification 914, the signals from the computer or appliance 810 and signals from the in-room 101 microphone array 703.

With reference now to FIG. 11*a*, shown is an exemplary signal flow within the Target Processor (bubble processing) unit 912. This example preferably monitors 8192 bubbles, or e.g., hundreds, thousands, or tens of thousands virtual microphone bubbles simultaneously (e.g., to achieve full or near full room coverage). The sound from each microphone element 704 is sampled at the same time as the other elements within the microphone array 703 and, preferably, at a fixed rate of 12 kHz. Each sample is passed to a microphone element processor 1101 illustrated in FIG. 11b. The microphone element processor 1101 preferably conditions and aligns the signals in time and weights the amplitude of each sample so they can be passed on to the summing node 1110.

The signal components 1107 from the microphone's element processor 1101 are summed at node 1110 to provide the combined microphone array 703 signal for each of the, e.g., 8192, virtual microphone bubbles. Each bubble signal is preferably converted into a power signal at node 1111 by squaring the signal samples. The power signals are then preferably summed over a given time window by the 8192 accumulators at node 1112. The sums represent the signal energy over that time period.

The processing gain for each bubble is preferably calculated at node 1113 by dividing the energy of each bubble by the energy of an ideal unfocused signal 1119. The unfocused signal energy is preferably calculated by summing 1109 the energies of the unfocused signals from each microphone element 1105 over the given time window, weighted by the maximum ratio combining weight squared. This is the energy that we would expect if all of the signals were uncorrelated. The processing gain 1113 is then preferably calculated for each bubble by dividing the microphone array signal energy by the unfocused signal energy from node 1109.

With continuing reference to FIG. 11a, processing gain is achieved because signals from a common sound source all experience the same delay before being combined, which results in those signals being added up coherently, meaning that their amplitudes add up. If twelve (12) equal amplitude and time aligned direct signals 1105 are combined the resulting signal will have an amplitude 12× higher, or a power level 144× higher. Signals from different sources and signals from the same source with significantly different delays as the signals from reverb and noise do not add up coherently and do not experience the same gain. In the extremes, the signals are completely uncorrelated and will add up orthogonally. If twelve (12) equal amplitude orthogonal signals are added up, the signal will have roughly 12× the power of the original signal or a 3.4× increase in amplitude (measured as rms). The difference between the 12× gain of the direct signal 1105 and the 3.4× gain of the reverb and noise signals is the net processing gain (3.4 or 11 dB) of the microphone array 703 when it is focused on the sound source 804. This makes the signal sound as if the microphone 704 has moved 3.4× closer to the sound source. This example uses a twelve (12) microphone array 703 but it could be extended to an arbitrary number (N) resulting in a maximum possible processing gain of sqrt (N) or 10 log (N) dB.

The target processor/bubble processor system 912 preferably simultaneously focuses the microphone array 703 on the, e.g., 8192, virtual microphone points 602 in 3D space using the method described above. The energy level of a short burst of sound signal (50-100 ms) is measured at each of the, e.g., 8192, virtual microphone bubble 602 points and compared to the energy level that would be expected if the signals combined orthogonally. This gives us the processing gain 1113 at each point. The virtual microphone bubble 602 that is closest to the sound source 804 should experience the highest processing gain and be represented as a peak in the output. Once that is determined, the location is known.

With continuing reference to FIG. 11a, node 1117 preferably searches through the output of the processing gain unit 1113 and/or other data accumulated and/or gathered (e.g., nodes 1110, 1111, 1112, 1114, 1115, 1115, 1119, 1120, 1121, 1122, 1123, and 11068) for the bubble with the highest processing gain functions. The (x, y, z) location and other source signal attributes 1102 of the virtual microphone 602 corresponding to that bubble can then be determined by looking up the index in the original configuration to determine the exact location of the sound source 804. The parameters 1102 may be communicated to various electronic devices to focus them to the identified sound source position. After deriving the location of the sound source 804, focusing the microphone array 703 on that sound source 804 can be accomplished after achieving the gain. The Targeting (Bubble) Processor 912 is designed to find the sound source 804 quickly enough so that the microphone array 703 can be focused while the sound source 804 is active which can be a very short window of opportunity. The bubble processor system 912 according to this embodiment is able to find new sound sources in less than 100 ms. Once found, the microphone array 703 focuses on that location to pick up the sound source signal 804 and the system 912 reports the location of the sound through the Identify Source Signal Position 1117 to other internal processes and to the host computer so that it can implement sound sourced location-based applications. Preferably, this is the purpose of the bubble processor 912. Since each bubble 602 will have a unique propagation delay to the microphones 704, a dynamic microphone bubble 602 to microphone array 703 pattern is developed. This pattern is unique to that dynamic microphone bubble location. This results in a propagation delay pattern to processing-gain matrix 1115 that is determined in FIGS. 11a and 11b. Once the max processing gain is determined from the, e.g., 8192, dynamic microphone bubbles 602, the delay pattern will determine the unique dynamic microphone bubble locations. The predefined bubble locations are calculated based on room size dimensions and the required spacing to resolve individual bubbles, which is frequency dependent.

The Mic Element Processor 1101, shown in FIG. 11b, is preferably the first process used to focus the microphone array 703 on a particular bubble 602. Individual signals from each microphone 704 are passed to a Precondition process 11065. The Precondition 11065 process filters off low frequency and high frequency components of the signal resulting in an operating bandwidth of 200 Hz to 1000 Hz.

Figure 13:
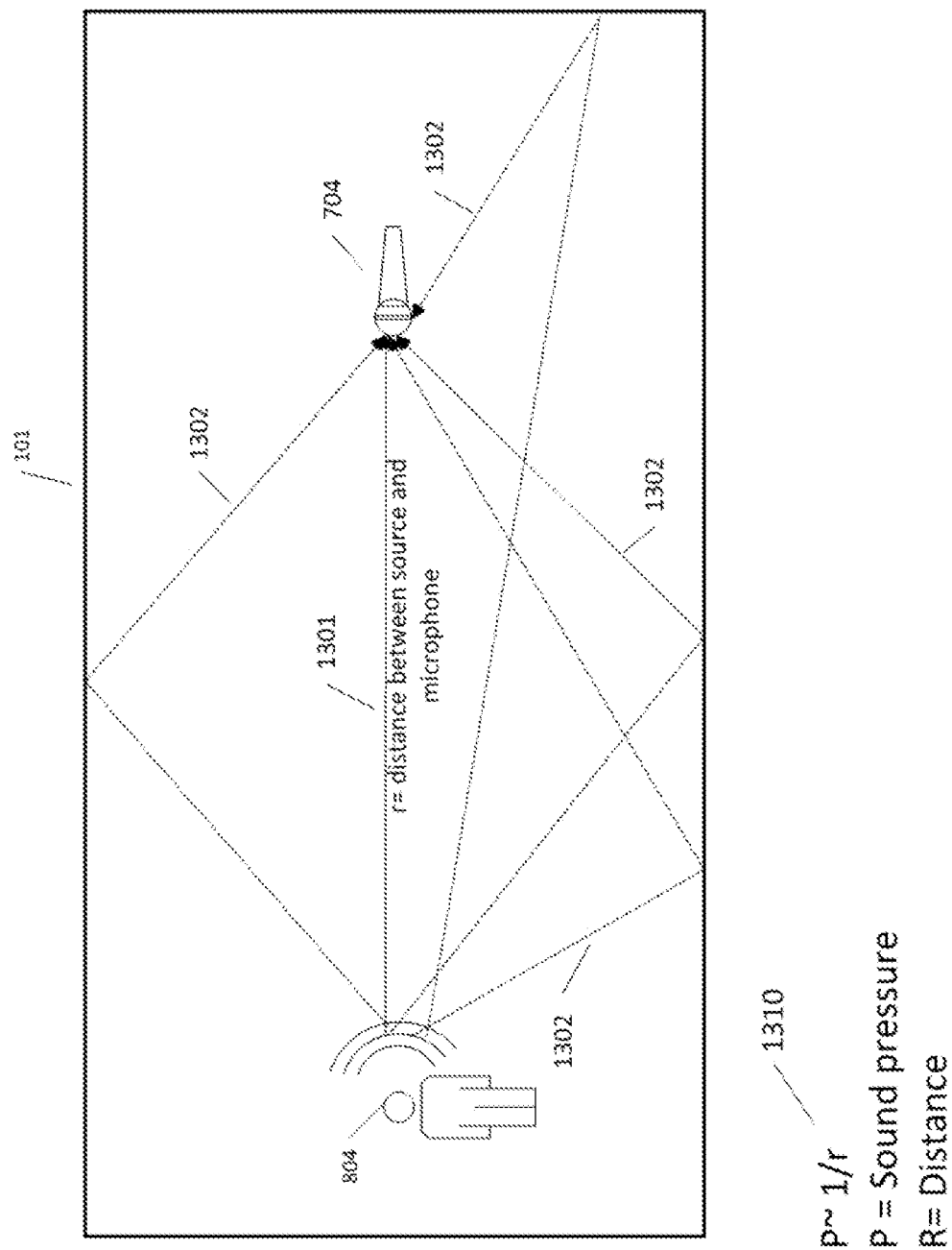
FIG. 13 illustrates correlations of direct signal and reflected signals.

With reference to FIG. 13, it may be expected that reflected signals 1302 will be de-correlated from the direct signal 1301 due to the fact that they have to travel a further distance and will be time-shifted relative to the desired direct signal 1301. This is not true in practice, as signals that are shifted by a small amount of time will have some correlation to each other. A "small amount of time" depends on the frequency of the signal. Low frequency signals tend to de-correlate with delay much less than high frequency signals. Signals at low frequency spread themselves over many sample points and make it hard to find the source of the sound. For this reason, it is preferable to filter off as much of the low frequency signal as possible without losing the signal itself. High frequency signals also pose a problem because they de-correlate too fast. Since there cannot be an infinite number of virtual microphone bubbles 602 in the space, there should be some significant distance between them, say 200 mm. The focus volume of the virtual microphone bubble 602 becomes smaller as the frequency increases because the tiny shift in delays has more of an effect. If the virtual microphone bubble volumes get too small, then the sound source may fall between two sample points and get lost. By restricting the high frequency components, the virtual microphone bubbles 602 will preferably be big enough that sound sources 804 will not be missed by a sample point in the process algorithm. The signal is preferably filtered and passed to the Microphone Delay line function 11066.

With reference again to FIG. 11b, a microphone (x) delay line 11066 preferably stores the pre-conditioned sample plus a finite number of previously pre-conditioned samples from that microphone element 704. During initialization, the fixed virtual microphone 402 positions and the calculated microphone element 704 positions are known. For each microphone element 704, the system preferably calculates the distance to each virtual microphone 602 then computes the added delay 11063 needed for each virtual microphone and preferably writes it to a delay look up table 11063. The system also computes the maximal ratio combining weight for each virtual microphone 602 (the virtual microphone bubble specific weight) and stores that in the weight lookup table 11064. See, for example, the '987 patent for a description of how to calculate the added delay 11063 and the maximal combining weight for each virtual microphone 602.

A counter 11061, preferably running at a sample frequency of more than 8192 times that of the microphone sample rate, counts bubble positions, e.g., from 0 to 8191, and sends this to the index of the two look up tables 11063 and 11064. The output of the bubble delay lookup table 11063 is preferably used to choose that tap of the delay line 11066 with the corresponding delay for that bubble. That sample is then preferably multiplied 11067 by the virtual microphone bubble weight 11064 read from the weight lookup table 11064. For each sample input to the microphone element processor 1101, 8192 samples are output 11068, each corresponding to the signal component for a particular virtual microphone bubble 602 in relation to that microphone element 1101.

With continuing reference to FIG. 11b, the second method by which the array may be used to improve the direct signal strength is by applying a specific virtual microphone bubble weight to the output of each microphone element 1101. Because the microphones 704 are not co-located in the exact same location, the direct sound 1301 will not arrive at the microphones 703 with equal amplitude, as shown in FIG. 13. The amplitude drops as 1/r and the distance (r) is different for each combination of microphone 704 and virtual microphone bubble 602. This creates a problem as mixing weaker sound source signals 804 into the output at the same level as stronger sound source signals 804 can actually introduce more noise and reverb (reflected signals) 1302 into the system 912 than not. Maximal Ratio Combining is the preferable way of combining signals 1110. Simply put, each signal in the combination should be weighted 11064 proportionally by the amplitude of the signal component to result in the highest signal to noise level. Since the distance that each direct path 1301 travels from each bubble position 602 to each microphone 704 is known, and since the 1/r law 1310 is also known, this can be used to calculate the optimum weighting 11064 for each microphone 704 at each of the, e.g., 8192, virtual microphone points 602.

Figure 12:
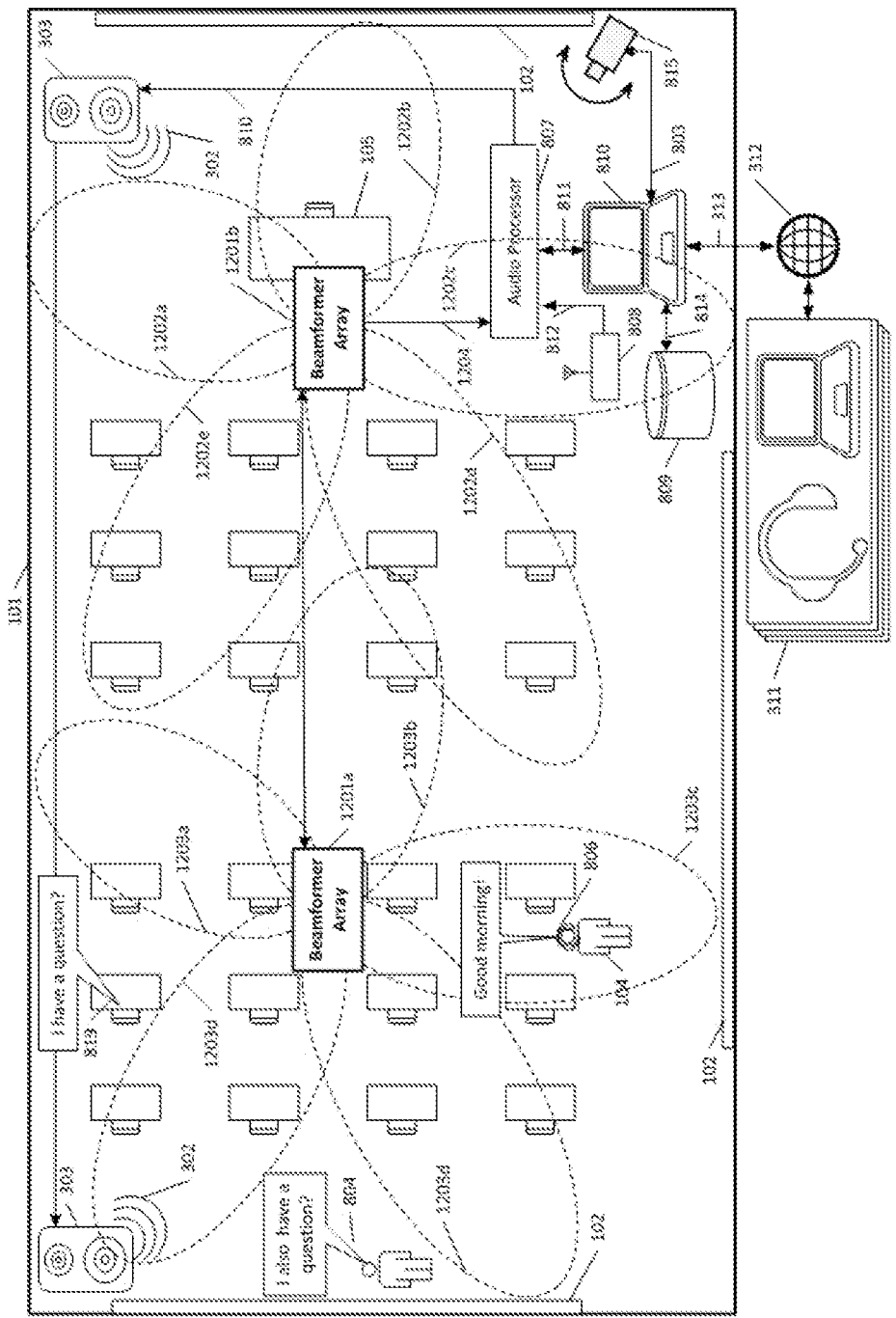
FIG. 12 is respectively, an illustration of alternate embodiment of the audio processor connected to a beamforming microphone array.

With reference now to FIG. 12, shown is an embodiment of the present invention conjured to a set of beamformer arrays 1201a, 1201b. The audio processor 807 is connected to the ceiling mounted beamformer arrays 1201a, 1201b. The beamformer arrays 1201a, 1201b are situated such that they create two separate coverage zones within the room 101. Beamformer 1201b has five (5) active zones 1202a, 1202b, 1202c, 1202d, 1202e and beamformer array 1201a has five active zones 1203a, 1203b, 1203c, 1203d, 1203e. Unlike the even fully distributed virtual microphone 602 coverage pattern (FIG. 6) the active talkers 804, 819 and any other talker located at any desk 405 would need to be located in one of the configured active beamformer zones 1202a, 1202b, 1202c, 1202d, 1202e, 1203a, 1203b, 1203c, 1203d, 1203e to be heard at the remote end 311. The teacher 104 wearing a wireless microphone 806 still has the freedom to move about the room as they require.

Speakers 303 are spread about the room 101 to provide the best room coverage so the teacher 104 can be heard clearly by all students in the room 101.

The individual components shown in outline or designated by blocks in the attached Drawings are all well-known in the electronic processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system, comprising:
one or more microphone arrays configured for unified communications sessions (UCCs) audio pickup, each of the one or more microphone arrays located in a shared space shared by one or more local participants, comprising a plurality of microphones combined and arranged in a product enclosure, wherein the one or more microphone arrays are configured to provide a full shared 3D space coverage for audio pickup of static and transient local participants not using a discrete microphone system, by locating and focusing on active talking local participants, in real-time, to receive audio signals from the focused one or more local participants;
one or more discrete microphone systems configured to provide amplification for in room reinforcement and UCCs audio pickup, wherein each of the one or more discrete microphone systems is configured to receive voice audio from a single local participant, per microphone system, among the one or more local participants located in the shared space;
one or more speakers all of which output audio signals to all of the one or more local participants in the shared space;
an audio processor connected to the one or more discrete microphone systems configured to provide amplification for in room reinforcement and UCCs audio pickup, the one or more microphone arrays configured for UCCs audio pickup, and the one or more speakers; and
a computer connected to the audio processor, wherein the computer is configured to receive audio signals from the audio processor and to output the audio signals from the audio processor to the one or more remote participants over Internet through one or more UCCs, and is configured to receive remote audio signals over the Internet from the one or more remote participants through the one or more UCCs, and to output the remote audio signals to the audio processor;

wherein the audio processor is configured to concurrently:
receive the remote participant audio signals from the computer through the one or more UCCs;
receive audio signals from the one or more microphone arrays configured for UCCs audio pickup;
receive audio signals from any of the one or more discrete microphone systems configured to provide amplification for in room reinforcement and UCCs audio pickup; and
split each received discrete microphone system audio signal into two identical audio streams, a first split audio signal stream and a second split audio signal stream, wherein:
the first split audio signal stream is amplified and combined with the output of the remote participant audio signals, and the combined output is transmitted to all of the one or more speakers in the shared space thereby providing (i) in room amplification from the one or more discrete microphones systems configured to provide amplification for in room reinforcement and (i1) in room speaker output from the one or more remote participants audio signals; and
the second split audio signal stream is combined with the audio signals from the one or more microphone arrays configured for UCCs audio pickup and output to the computer as combined audio signals for sending to one or more remote participants over the Internet through the one or more UCCs.

2. The system of claim 1 wherein the one or more discrete microphone systems comprise at least one wireless microphone wirelessly connected to a wireless transceiver connected to the audio processor and/or at least one wired microphone connected to the audio processor.

3. The system of claim 1 wherein the audio processor is configured to use the one or more microphone arrays to generate a plurality of virtual microphone bubbles to fill the shared space with the virtual microphone bubbles to capture the audio from the one or more local participants.

4. The system of claim 1 wherein the audio processor is configured to perform echo cancellation on the signals from the one or more microphone arrays by using the combined output of the first split audio signal stream and the output of the remote participant audio signals as reference signals.

5. The system of claim 1 wherein the audio processer includes a gating function that determines that the first split audio signal stream meets one or more gating function parameters before the first split audio signal stream is amplified and combined with the output of the remote participant audio signals.

6. The system of claim 1 wherein the audio processer includes a gating function that determines that the second split audio signal stream meets one or more gating function parameters before the second split audio signal stream is combined with the audio signals from the one or more microphone arrays configured for UCCs audio pickup.

7. The system of claim 1 wherein the audio processor is configured to condition audio signals from all of the one or more discrete microphone systems based on an expected signal level.

8. The system of claim 7 wherein the conditioning applies a positive or negative gain to the audio signals from all of the one or more microphone systems.

9. The system of claim 1 wherein the product enclosure is configured to include the plurality of microphones and the one or more speakers.

10. The system of claim 1 wherein the audio processor is configured to create a beamformer with varying lobes.

11. A system, comprising:
an audio processor comprising at least two outputs including a first output and a second output, and at least three inputs including a first input, a second input and a third input;
one or more discrete microphone systems connected to the audio processor and configured to provide amplification for in room reinforcement and unified communications sessions (UCCs) audio pickup, wherein each of the one or more discrete microphone systems is configured to receive voice audio from a single local participant, per microphone system, among one or more local participants located in a shared space shared by the one or more local participants;
one or more microphone arrays connected to the audio processor and configured for the UCCs audio pickup, each of the one or more microphone arrays located in the shared space, comprising a plurality of microphones combined and arranged in a product enclosure, wherein the one or more microphone arrays are configured to provide a full shared 3D space coverage for audio pickup of static and transient local participants not using a discrete microphone system, by locating and focusing on active talking local participants, in real-time, to receive audio signals from the focused one or more local participants;
one or more speakers connected to the audio processor, wherein all of the one or more speaker output audio signals to all of the one or more local participants in the shared space; and
a computer connected to the audio processor, wherein the computer is configured to receive audio signals from the audio processor and to output the audio signals from the audio processor to one or more remote participants over Internet through one or more UCCs, and is configured to receive remote audio signals over the Internet from the one or more remote participants through the one or more UCCs, and to output the remote audio signals to the audio processor;
wherein the audio processor is configured to concurrently:
receive the remote participant audio signals, through the first input, from the computer through the one or more UCCs;
receive audio signals, through the second input, from the one or more microphone arrays configured for UCCs audio pickup;
receive audio signals, through the third input, from any of the one or more discrete microphone systems configured to provide amplification for in room reinforcement and UCCs audio pickup; and
split each received discrete microphone system audio signal into two identical audio streams, a first split audio signal stream and a second split audio signal stream, wherein:
the first split audio signal stream is amplified and combined with the output of the remote participant audio signals, and the combined output is transmitted, through the first output, to all of the one or more speakers in the shared space thereby providing (1) in room amplification from the one or more discrete microphones systems configured to provide amplification for in room reinforcement and

(11) in room speaker output from the one or more remote participants audio signals; and the second split audio signal stream is combined with the audio signals from the one or more microphone arrays configured for UCCs audio pickup and output, through the second output, to the computer as combined audio signals for sending to one or more remote participants over the Internet through the one or more UCCs.

12. The system of claim 11 wherein the one or more discrete microphone systems comprise at least one wireless microphone wirelessly connected to a wireless transceiver connected to the audio processor and/or at least one wired microphone connected to the audio processor.

13. The system of claim 11 wherein the audio processor is configured to use the one or more microphone arrays to generate a plurality of virtual microphone bubbles to fill the shared space with the virtual microphone bubbles to capture the audio from the one or more local participants.

14. A method, comprising:

receiving audio signals, via an audio processor, from one or more remote participants through a computer configured to receive the remote participant audio signals over Internet from the one or more remote participants through one or more unified communications sessions (UCCs);

receiving audio signals, via the audio processor, from one or more microphone arrays configured for UCCs audio pickup, wherein each of the one or more microphone arrays is located in a shared space shared by one or more local participants, and comprises a plurality of microphones combined and arranged in a product enclosure, wherein the one or more microphone arrays are configured to provide a full shared 3D space coverage for audio pickup of static and transient local participants not using a discrete microphone system, by locating and focusing on active talking local participants, in real-time, to receive audio signals from the focused one or more local participants;

receiving audio signals, via the audio processor, from any of one or more discrete microphone systems configured to provide amplification for in room reinforcement and UCCs audio pickup, wherein each of the one or more discrete microphone systems is configured to receive voice audio from a single local participant, per microphone system, among the one or more local participants located in the shared space;

splitting each received discrete microphone system audio signal into two identical audio streams, a first split audio signal stream and a second split audio signal stream;

amplifying the first split audio signal stream, and combining the first split audio signal stream with the received remote participant audio signals;

transmitting the combined first split audio signal stream with the received remote participant audio signals to all of one or more speakers in the shared space thereby providing (i) in room amplification from the one or more discrete microphones systems configured to provide amplification for in room reinforcement and (ii) in room speaker output from the one or more remote participants audio signals;

combining the second split audio signal stream with the audio signals from the one or more microphone arrays configured for UCCs audio pickup; and outputting the combined second split audio signal stream with the audio signals from the one or more microphone arrays to the computer for sending, via the computer, to the one or more remote participants over the Internet through the one or more UCCs.

15. The method of claim 14 wherein the one or more discrete microphone systems comprise at least one wireless microphone wirelessly connected to a wireless transceiver connected to the audio processor and/or at least one wired microphone connected to the audio processor.

16. The method of claim 14 wherein the audio processor is configured to use the one or more microphone arrays to generate a plurality of virtual microphone bubbles to fill the shared space with the virtual microphone bubbles to capture the audio from the one or more local participants.

17. The method of claim 14 wherein the audio processor is configured to perform echo cancellation on the signals from the one or more microphone arrays by using the combined output of the first split audio signal stream and the output of the remote participant audio signals as reference signals.

18. The method of claim 14 wherein the audio processer includes a gating function that determines that the first split audio signal stream meets one or more gating function parameters before the first split audio signal stream is amplified and combined with the output of the remote participant audio signals.

19. The method of claim 14 wherein the audio processer includes a gating function that determines that the second split audio signal stream meets one or more gating function parameters before the second split audio signal stream is combined with the audio signals from the one or more microphone arrays configured for UCCs audio pickup.

* * * * *